United States Patent [19]

Kitahara et al.

[11] Patent Number: 5,377,319
[45] Date of Patent: Dec. 27, 1994

[54] HELP GUIDANCE METHOD UTILIZING AN ANIMATED PICTURE

[75] Inventors: Yoshinori Kitahara, Musashimurayama; Takehiro Fujita, Kokubunji; Shigeru Yabuuchi; Keiichi Yoshioka, both of Tokyo, all of Japan

[73] Assignee: Hitachi, Ltd., Tokyo, Japan

[21] Appl. No.: 29,055

[22] Filed: Mar. 10, 1993

[30] Foreign Application Priority Data

Mar. 10, 1992 [JP] Japan ................................ 4-051301

[51] Int. Cl.⁵ ............................................. G06F 15/46
[52] U.S. Cl. .................................... 395/161; 395/152; 395/157
[58] Field of Search ............... 395/161, 152, 159, 155, 395/157; 364/200

[56] References Cited

U.S. PATENT DOCUMENTS 5,111,409  5/1992  Gasper et al. .................. 395/152 X
5,235,679  8/1993  Yoshizawa et al. ............ 395/161 X

OTHER PUBLICATIONS

Microsoft Windows User's Guide (Trademark of Microsoft Cor.), 1990, pp. 70-74.

*Primary Examiner*—Heather R. Herndon
*Assistant Examiner*—Cliff Nguyen Vo
*Attorney, Agent, or Firm*—Antonelli, Terry, Stout & Kraus

[57] ABSTRACT

A help guidance method utilizing an animated picture, used for an information processor including a memory for storing a help control program for controlling help guidance, animated picture help data, text help data and voice help data used for carrying out the help guidance, and a table for showing the correspondence relationship among the animated picture help data, the text help data and the voice help data. The method includes the steps of: activating, when a user inputs a help command for requiring the help guidance, the help control program to display fields, in which the help guidance is to be carried out, in the form of help menu; and reading out, when the user selects the field requiring the help guidance from the help menu, the animated picture help data corresponding to the selected contents, and at least one of the text help data and the voice help data, which correspond to the selected animated picture help data, from the memory means by referring to the table to output the animated picture help data and the at least one thereof.

16 Claims, 24 Drawing Sheets

FIG. 14

| 201 | 202 | 203 | 204 | 205 |
|---|---|---|---|---|
| CODE | MANIPULATION MENU ITEM | IMAGE DATA ADDRESS | TEXT DATA ADDRESS | VOICE DATA ADDRESS |
| 1 | TO MOVE GRAPHIC FORM | 1001 | 2001 | 3001 |
| 2 | TO DUPLICATE GRAPHIC FORM | 1002 | 2002 | 3002 |
| 3 | TO ROTATE GRAPHIC FORM | 1003 | 2003 | 3003 |
| ... | ... | ... | ... | ... |
| 8 | TO REDUCE GRAPHIC FORM | 1008 | 2008 | 3008 |

FIG. 15

| ADRS | | | ~401 |
|---|---|---|---|
| CT | | | ~401' |
| X | | | ~402 |
| Y | | | ~403 |
| N | | | ~404 |
| R1 | G1 | B1 | ~405 |
| R2 | G2 | B2 | |
| ⋮ | ⋮ | ⋮ | |

FIG. 18

| 601 | 602 |
|---|---|
| DISPLAY SPEED CODE | f |
| 5 | 60 |
| 4 | 40 |
| 3 | 20 |
| 2 | 10 |
| 1 | 5 |
| 0 | 0 |
| −1 | 5 |
| −2 | 10 |
| −3 | 20 |
| −4 | 40 |
| −5 | 60 |

FIG. 16A
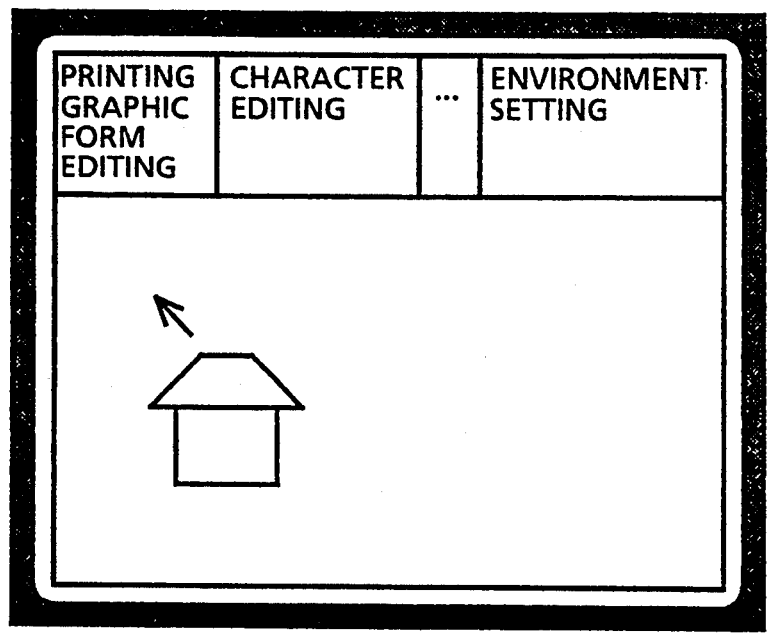
FIG. 16B
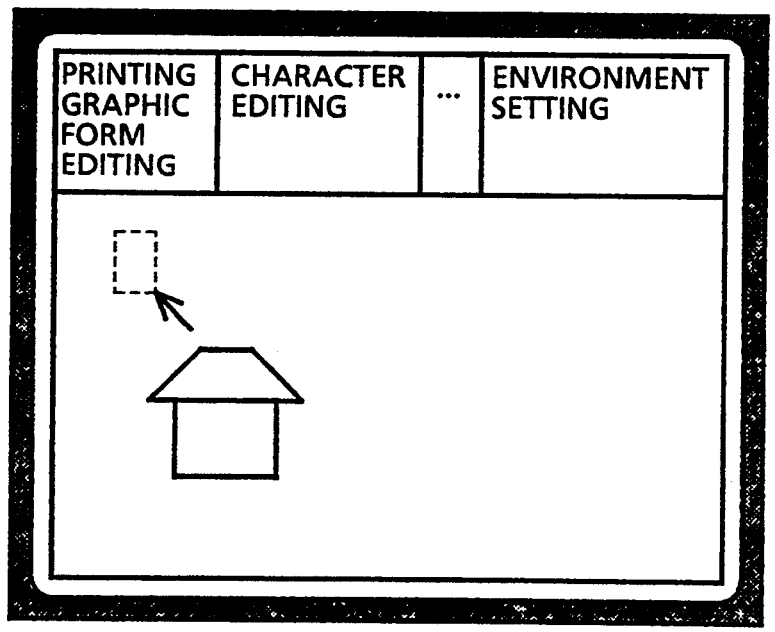

FIG. 16C
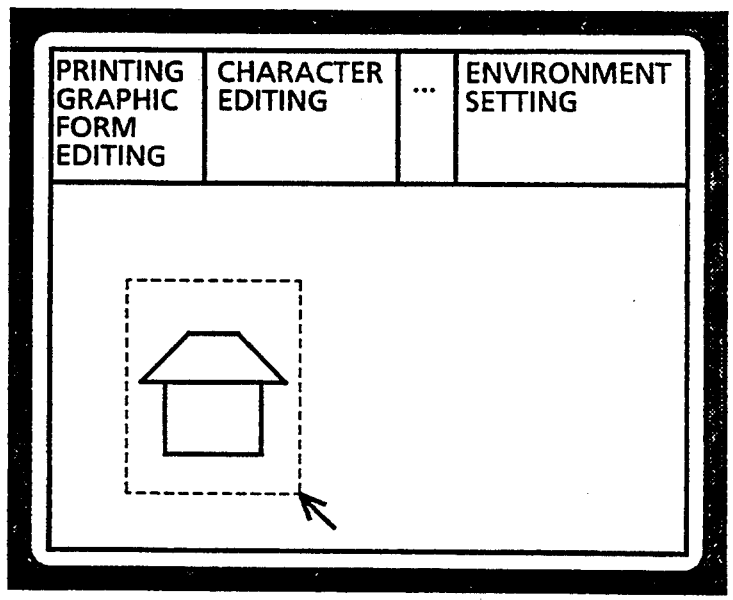
FIG. 16D
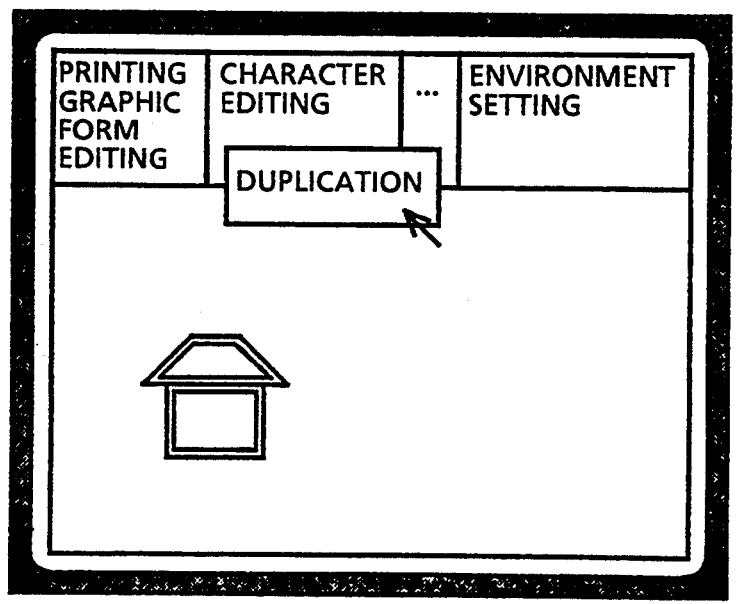

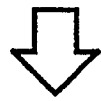
FIG. 16Z
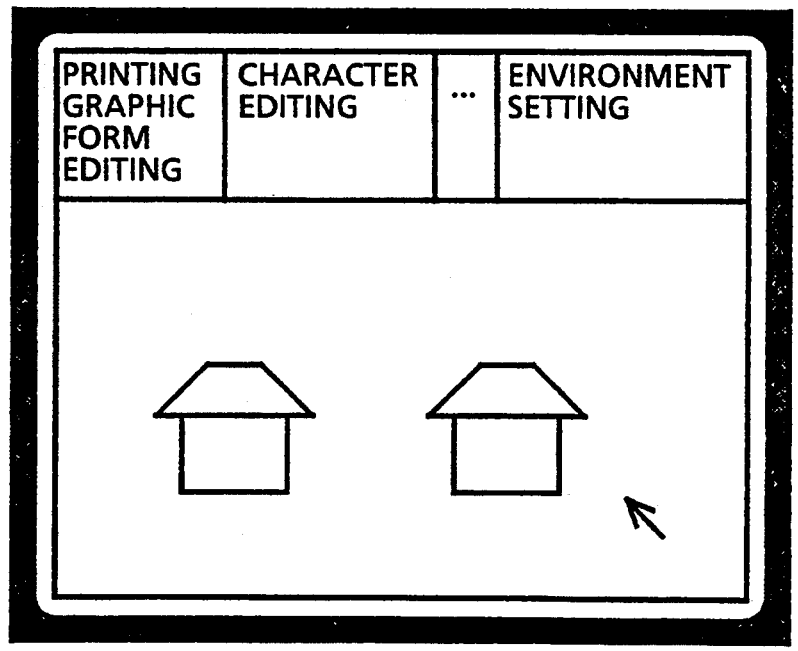

FIG. 22

| ADDRESS (611) | ANIMATED PICTURE FRAME NUMBER (612) | TEXT HELP MESSAGE POSITION (613) | VOICE HELP MESSAGE POSITION (614) |
|---|---|---|---|
| 1001 | 1 | $p_{10011}$ | $q_{10011}$ |
| | 2 | $p_{10012}$ | $q_{10012}$ |
| | ⋮ | ⋮ | ⋮ |
| | i | $p_{1001i}$ | $q_{1001i}$ |
| | i+1 | $p_{1001i+1}$ | $q_{1001i+1}$ |
| | ⋮ | ⋮ | ⋮ |
| | M | $p_{1001M}$ | $q_{1001M}$ |
| 1002 | 1 | $p_{10021}$ | $q_{10021}$ |
| | 2 | $p_{10022}$ | $q_{10022}$ |
| | ⋮ | ⋮ | ⋮ |
| | i | $p_{1002i}$ | $q_{1002i}$ |
| | i+1 | $p_{1002i+1}$ | $q_{1002i+1}$ |
| | ⋮ | ⋮ | ⋮ |
| | N | $p_{1002N}$ | $q_{1002N}$ |

HELP GUIDANCE METHOD UTILIZING AN ANIMATED PICTURE

BACKGROUND OF THE INVENTION

The present invention relates to a help guidance method for an OA (Office Automation) apparatus such as a personal computer, a work station, a word processor, an electronic filing system, or a facsimile machine and provides a help guidance method which is conveniently used by a user.

In the prior art help guidance method described in JP-A-62-90756 which has title "Document Producing Apparatus", there is typically known a method in which, when an operation assisting key is pressed down, on the basis of the working process at that time, the contents of the operation assistance are determined, and, on the basis of the determined contents, property sheet data corresponding to the necessary operation guide information is displayed. Moreover, as described in JP-A-1-37613 which has title "Help System for an Electronic Apparatus", there is also known a method in which, on the basis of input words and input using a help key, the desired document for explaining a function is read out from a helping word dictionary to be displayed on a display device. Further, as described in JP-A-1-99122 which has title of "System for Outputting a Message of Explaining terminology", there is also known a method in which, when pointing a term which is intended to be explained on the help message, explanatory information is output.

Thus, in the prior art, the help message, which is presented to the user at the time when the help function is called, is text information, so that the user must read in detail the text help message and then understand the contents thereof. Therefore, there arises a problem that the operation is troublesome for the user and the work must be interrupted for a long time. Moreover, the help message with respect to the graphic form editing, the table production, the image editing and the like is not easily represented in text form. Furthermore, the contents of the help message text are not easily understood by the user. This is another problem. The help guidance is a support mechanism which presents the guidance information to the user in the case where the procedure and the like are not clear when the user intends to start the work, or in the case where the error occurs during the work and the disposition therefor is not clear for the user. Therefore, when all of the help guidance is formed by the text message, as described above, the inconveniences may occur in many cases.

Incidentally, the possibility of the help system utilizing an animated picture as the help guidance, rather than the text information, is suggested in the report introduced by the Topics of "MACLIFE" (August 1991, pp. 120 to 123). However, the detailed realization method is not disclosed in this report.

On the other hand, with respect to the icon in which the information is displayed in the form of picture, the user can intuitively grasp the concept thereof, whereas the interpretation of the picture is entrusted to the user and therefore it is unsuited for the presentation of the detailed information.

The guidance method utilizing the icon is, for example, shown in U.S. patent application Ser. No. 537,493 filed on Jun. 12, 1990 by Hitachi, Ltd.

SUMMARY OF THE INVENTION

It is therefore an object of the present invention to provide a help guidance method in which the operational contents to be carried out can be understood intuitively by a user and operational assistance can be easily obtained at a high speed without reading a text help message such as an operation manual when the associated operation assisting key can be pressed down, and which is readily used by the user.

The present invention includes a help memory unit for storing help guidance information which is represented in the form of time series data (animated picture) of an image, a help calling unit for calling the stored help guidance information at an arbitrary time, and a help display device for displaying the help guidance information in the form of an animated picture, whereby, when a user calls for help, the help guidance information is presented in the form of animated picture, text and/or voice to the user. Moreover, the present invention may also provide a function in which the user can control a display time interval of the animated picture.

When the user inputs a help request code, a help control program is then activated, and as a result, a window for help is opened and a of a help menu is displayed in the window for help. When the help menu is thus displayed, one selection request code out of the operating procedure items is input, and the corresponding image data addresses are read out. Then, the animated picture data of R, G and B, which are stored in the image data addresses are read out and are then sent to a video RAM and are finally displayed as an image pattern in the window for help, one frame at a time. Moreover, when a code of requesting display of a text help message is input, the help control program reads out the text help message data addresses corresponding to the operating procedure item code, and the display of the animated picture and the text display process are carried out simultaneously. By this process, a text display program is activated and then the text display window is opened. Subsequently, character data which has been stored in the text help message data addresses is read out and then is sent to the video RAM, so that a text help message is displayed in the text display window. In addition, when a code requesting output of a voice help message is input, the help control program reads out the address of the voice help message data corresponding to the operating procedure item code, and the display of the animated picture and a voice guide output process are carried out simultaneously. By this process, a voice guide output program is activated, voice waveform data, which has been stored in the voice help message data address, is read out and then sent to a D/A converter, so that the help message is output in the form of voice from a speaker.

As described above, according to the present invention, since the help guidance system has a function of displaying the message in the form of an animated picture, the user can understand the subsequent operation speedily and intuitively for the objective work without interrupting the work for a long time to read the explanation in the text, as in the prior art. Moreover, since the message which is represented in the form of animated picture can be displayed at an arbitrary speed or stationarily, the support is made possible in correspondence to the pace of the user. Further, since the help guidance system of the present invention also has the function of presenting the help message in text form of text or by voice, the intuitive and logical explanation is made possible by the user's visual sense and auditory sense. In particular, the help guidance system is provided with the function in which, when the text is displayed or the voice is output, the degree of the understanding of the user is determined on the basis of the playback number of animated pictures and still pictures and the playback time thereof to present the help message in the form of text or voice to the user. Accordingly, the present invention provides the help guidance which is conveniently used by the user.

BRIEF DESCRIPTION OF THE DRAWINGS

FIG. 14 is a diagram showing a data structure of a graphic form operating menu table;

FIG. 15 is a diagram showing a data structure of animated picture help data;

FIGS. 16A to 16D and 16Z are diagrams showing an example of animated picture data;

FIG. 18 is a diagram showing a data structure of a display speed table;

FIG. 22 is a diagram showing a data structure of a message correspondence table;

DESCRIPTION OF THE PREFERRED EMBODIMENTS

The preferred embodiments of the present invention will hereinafter be described in detail with reference to the accompanying drawings.

Figure 1:
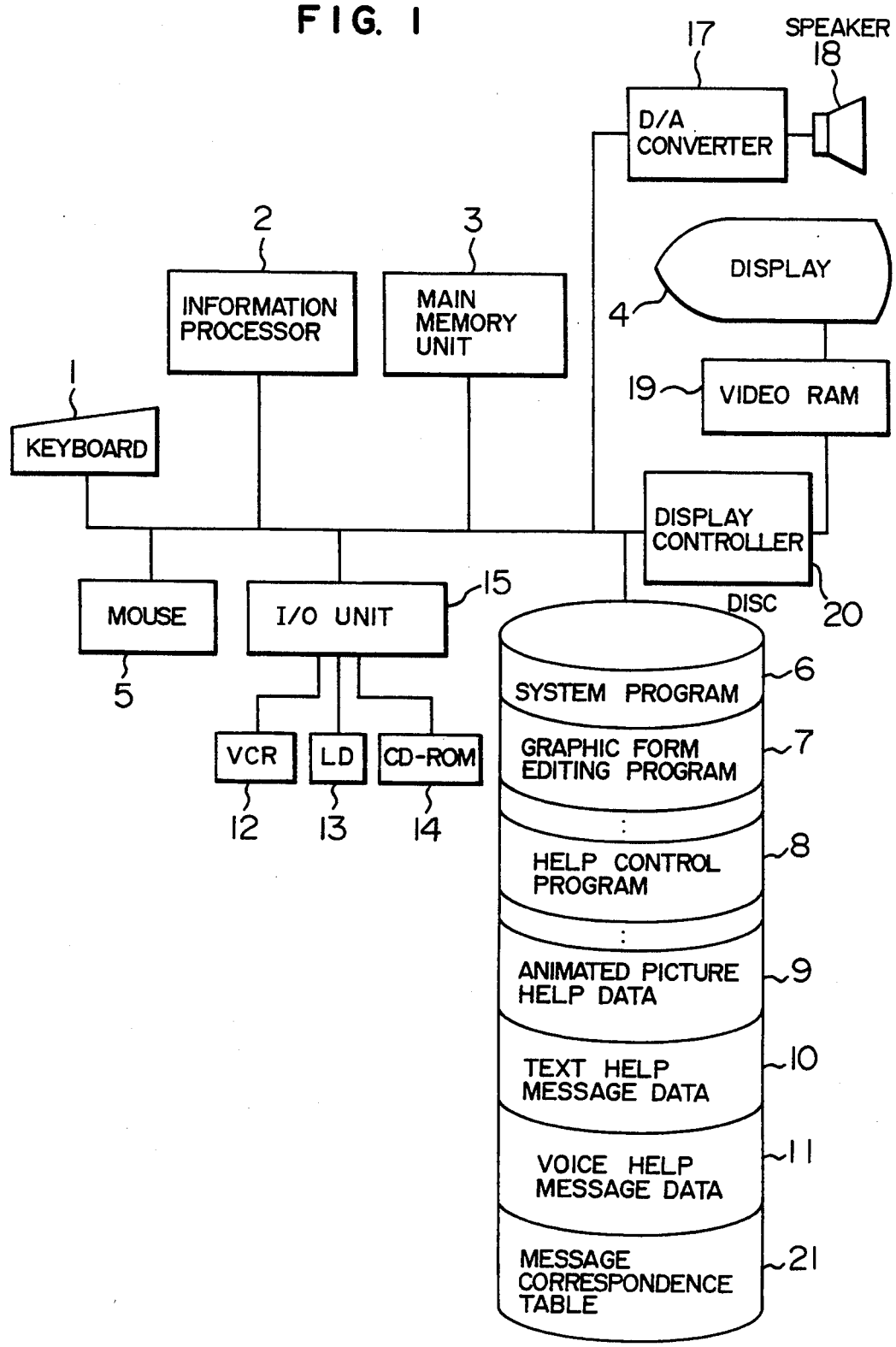
FIG. 1 is a block diagram showing a system configuration of a work station of an embodiment according to the present invention.

FIG. 1 is a block diagram showing a system configuration of a work station of an embodiment according to the present invention. It is to be understood that the work station is no more than an example useful in explaining the present invention and thus it does not limit the scope of application of the present invention.

In FIG. 1, on the basis of a command or a help request code which has been input from an input unit such as a keyboard 1 or a mouse 5, an information processor 2 serves to load a system program 6, a graphic form editing program 7, a help control program 8, animated picture help data 9, text help message data 10, voice help message data 11, or a message correspondence table 21, which is provided on a disc, into a main memory unit 3, actuate the loaded program to display the editing result, the help information and the like on a display device 4 through a display controller 20 and a video RAM 19, or output the voice information, which has been input through an I/O unit 15 from VCR 12, LD 13 or CD-ROM 14, from a speaker 18 through a D/A converter 17.

The duplication of the graphic form editing which is taken in the present embodiment as an work example in the work station will hereinbelow be described in detail.

Figure 2:
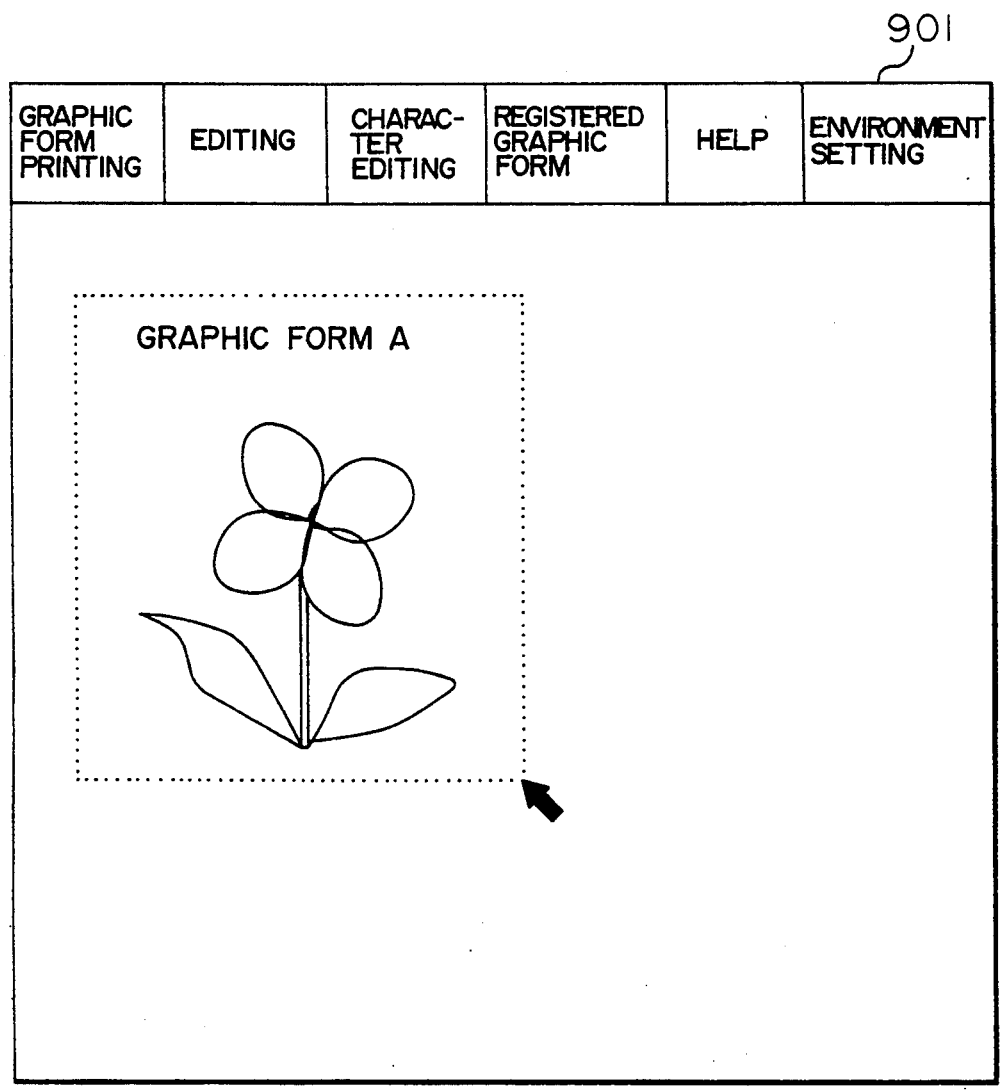
FIG. 2 is a diagram showing an example of a picture of graphic form editing.
Figure 3:
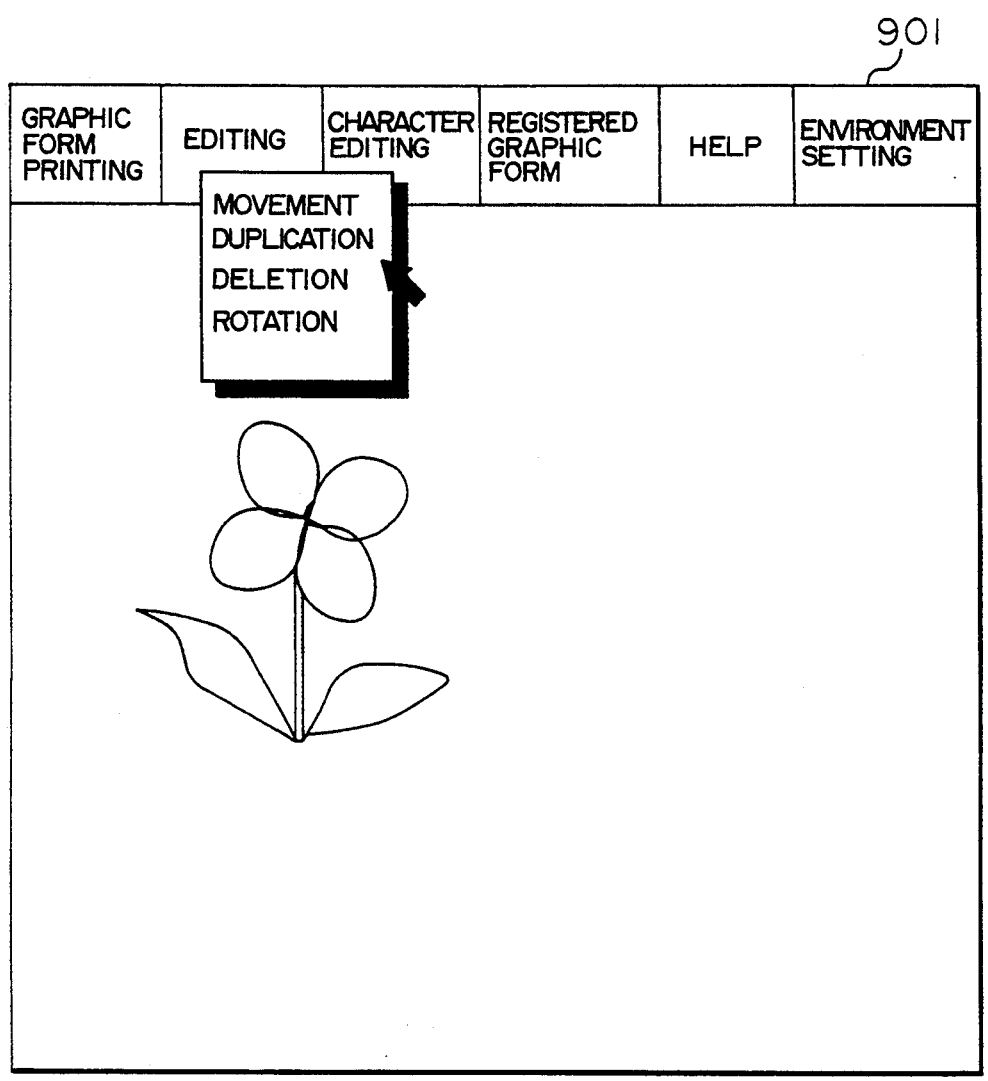
FIG. 3 is a diagram showing an example of a picture of graphic form editing in which a pull-down editing menu is drawn out.
Figure 4:
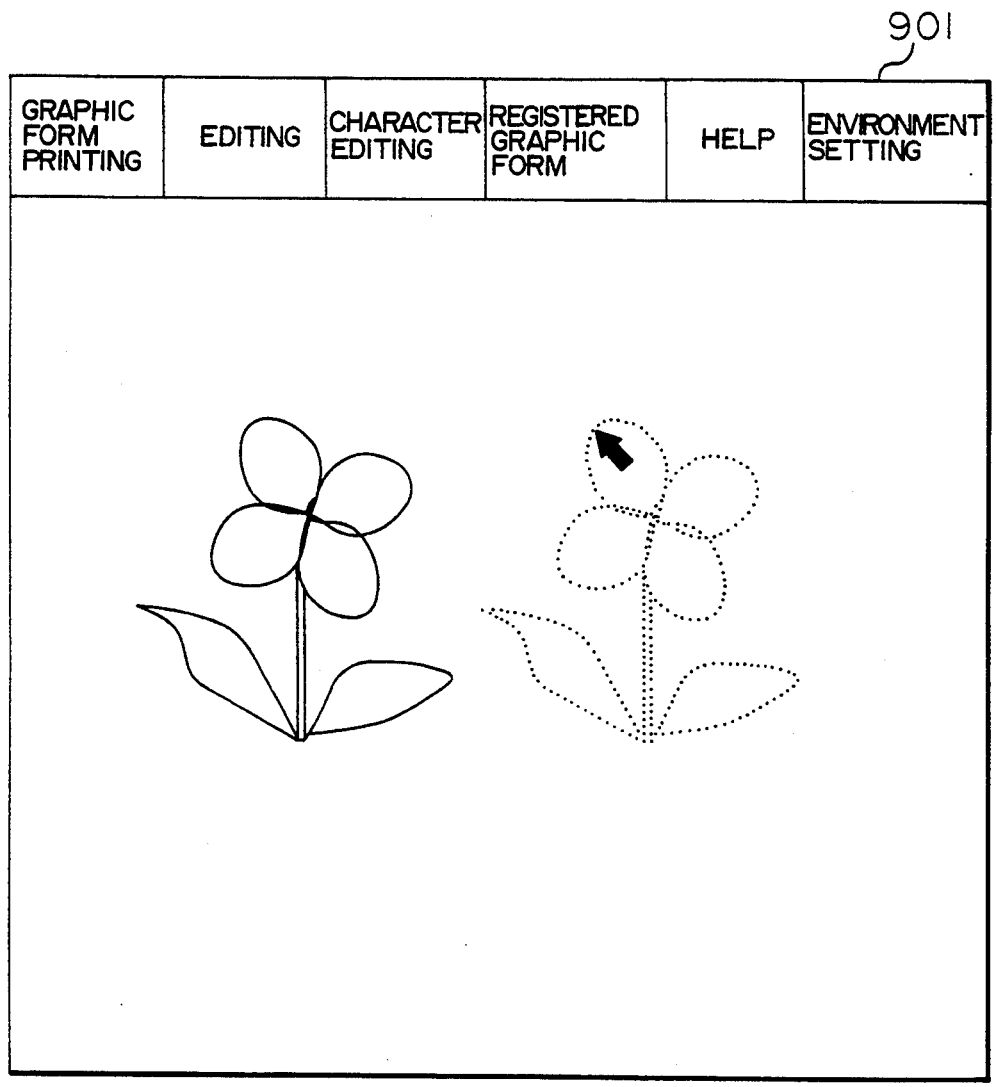
FIG. 4 is a diagram showing an example of position designation for duplication of a graphic form.

FIG. 2 is an example of a picture of the graphic form editing which is displayed on the display device 4 through the graphic form editing program loaded into the main memory unit 3. In the figure, a window 901 is a window for the editing work. Then, it is assumed that a user will duplicate a graphic form A in the figure. First, the mouse 5 is dragged as indicated by a dotted line, thereby to designate an area containing the graphic form A. Next, "Graphic Form Editing" in the menu which is displayed in the upper area of the display device 4 is picked using the mouse 5 to draw out a pull-down editing menu as shown in FIG. 3. After the item of "Duplication" in the pull-down editing menu has been picked using the mouse 5, as shown in FIG. 4, the mouse 5 is dragged up to the position where the duplication is to be performed, and when a mouse button is then released, the graphic form A is duplicated at the release point. As for the above-mentioned graphic form editing method, for example, the method which is used in Macintosh manufactured by Apple Ltd. is available.

By performing the operation set forth above, "Duplication" of the desired graphic form can be carried out. However, some users may not necessarily remember the method of graphic form editing including "Graphic Form Duplication" in some cases. In such cases, in the prior art, the operating procedure needs to be confirmed by referring to the procedure manual on all such occasions.

As for another method for obtaining the guidance in addition to the manual, there is provided a method of selecting the "Help" item in the menu displayed in the upper area of the display device 4. In this case, since the help guidance information is displayed in text form on the screen, the user also needs to read the text information in detail, and as a result, the work will be necessarily interrupted.

Then, in the present embodiment, the help message is constructed using an animated picture, not the text, in such a way that the user can obtain support for the operation intuitively without interrupting the work for a long time. An embodiment of a method for calling the animated picture help will hereinbelow be described in detail with reference to flow charts shown in FIG. 5 and FIG. 6.

Figure 9:
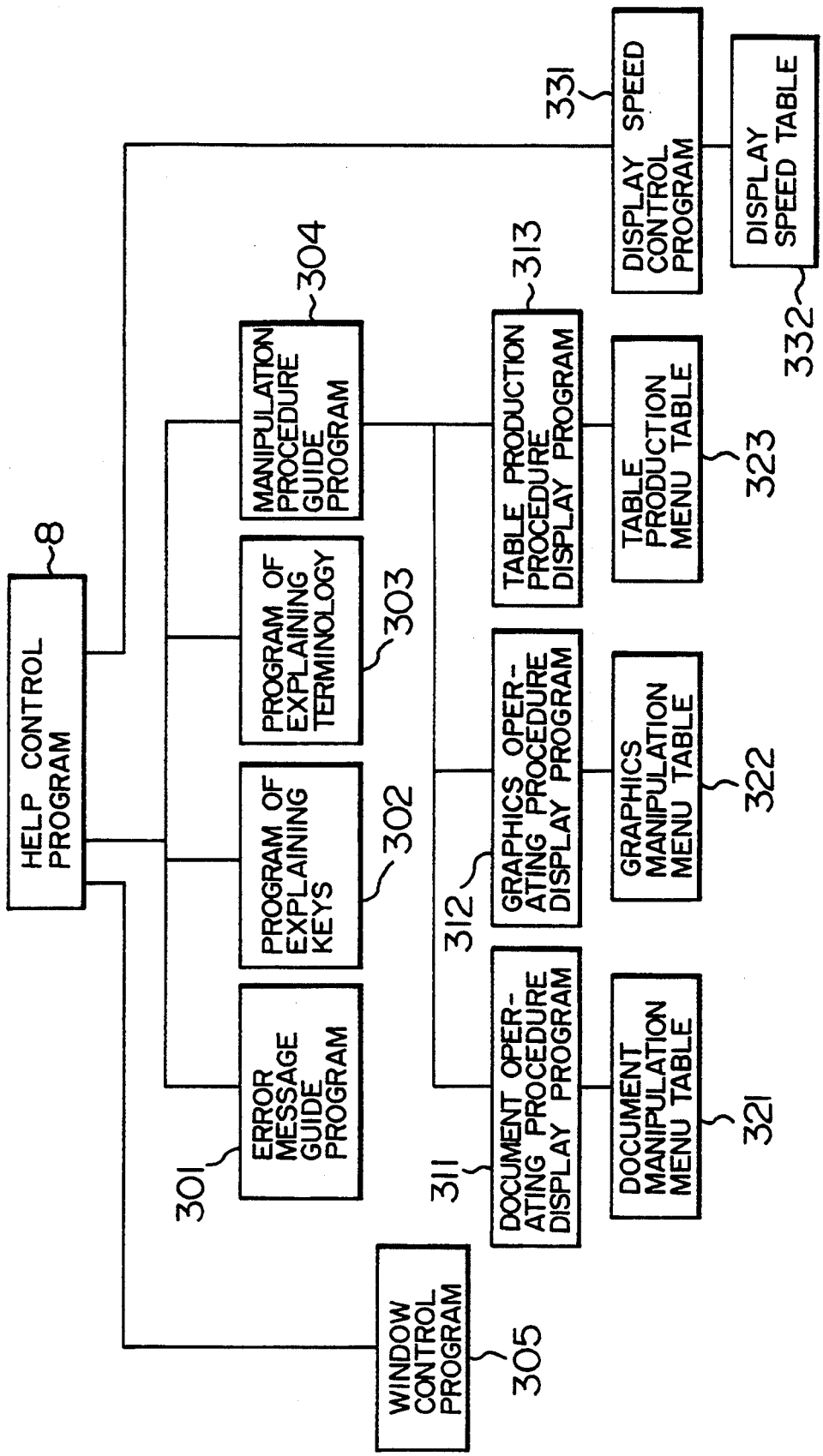
FIG. 9 is a diagram showing a module structure of an example of a help control program according to the present invention.

FIG. 9 shows a module structure of the help control program 8 of the present invention. When the system is activated, the help control program 8 on the disc is loaded, together with the system program 6, the graphic form editing program 7, the animated picture help data 9, the text help message data 10, the voice help message data 11, the message correspondence table 21 and the like on the disc, into the main memory unit 3 by the information processor 2.

Figure 5:
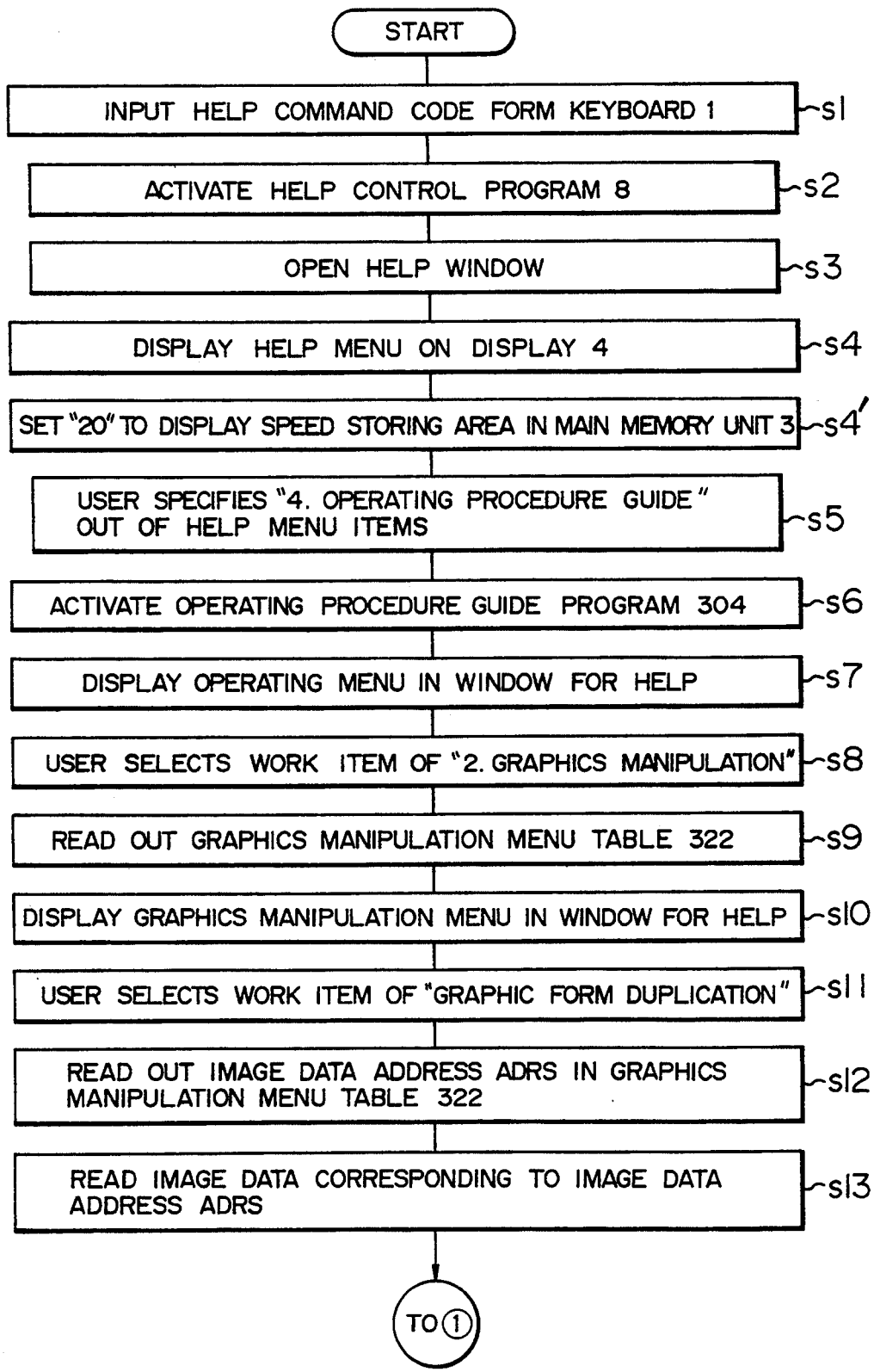
FIG. 5 is a flow chart showing the operation of an embodiment of the present invention.
Figure 6:
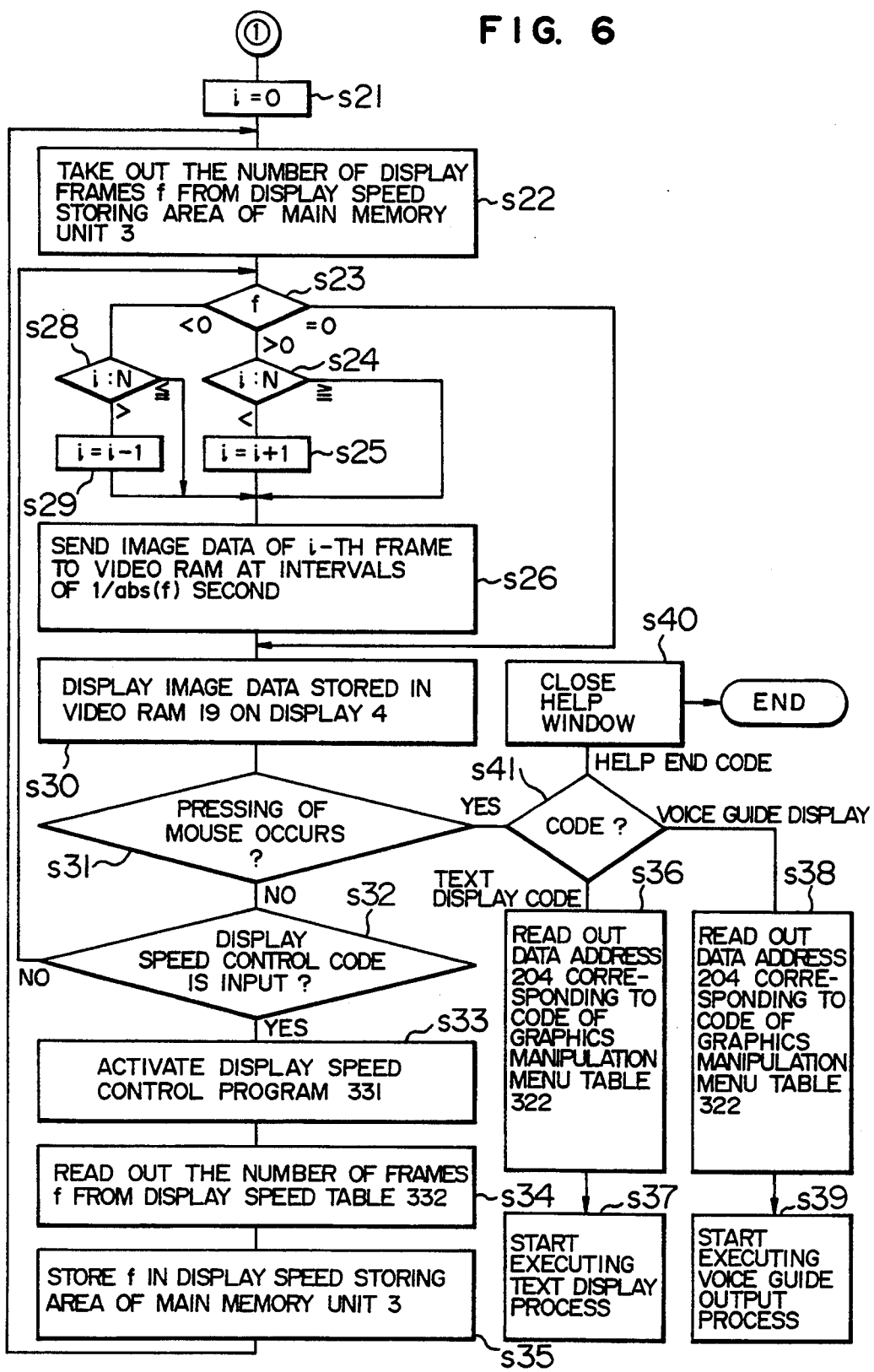
FIG. 6 is a flow chart showing the operation of an embodiment of the present invention.
Figure 10:
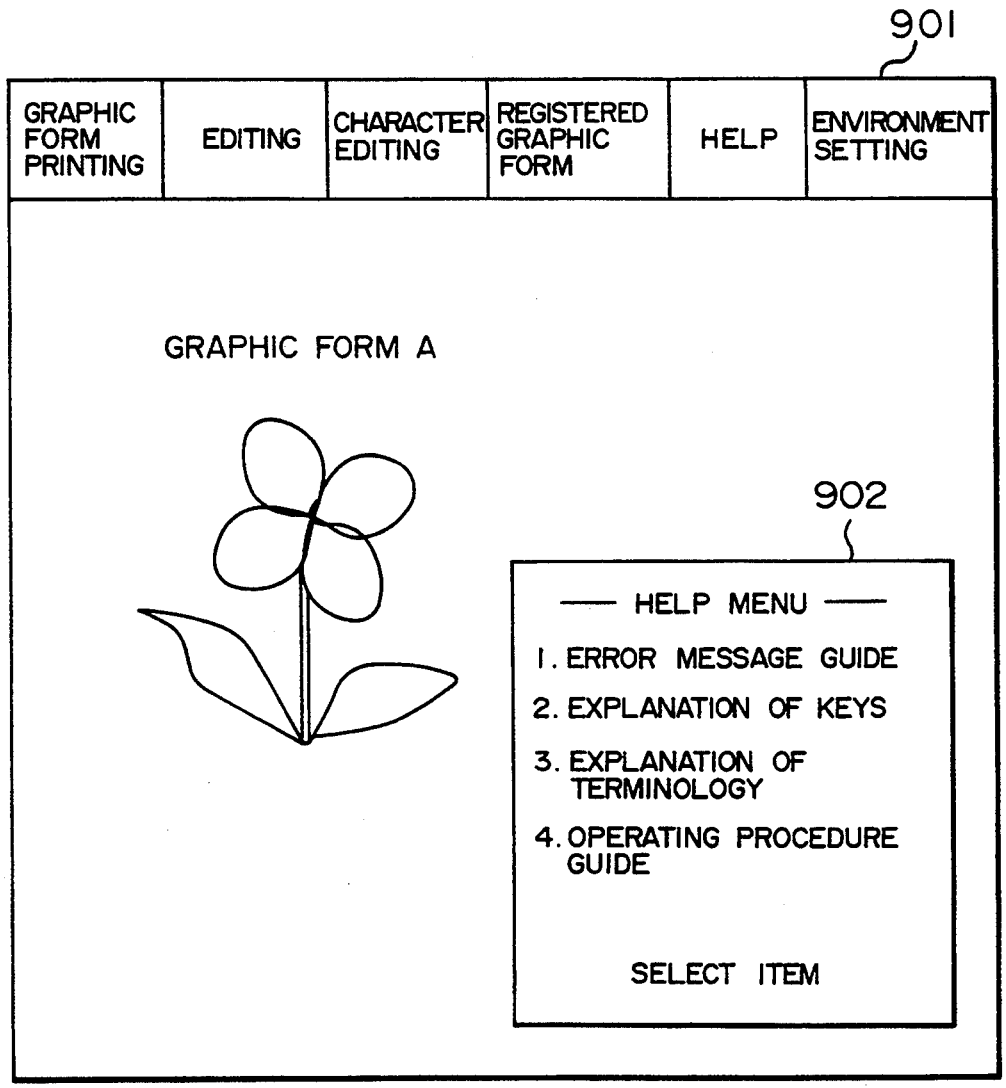
FIG. 10 is a diagram showing an example of a help menu.

Referring back to the flow charts of FIGS. 5 and 6, the user who wants to duplicate the graphic form A shown in FIG. 10 but does not know the operation thereof, first, presses down a help key on the keyboard 1 to input a help request code (Step s 1). The input of the help request code is not limited to only the method by the keyboard 1. That is, for example, the help request code may also be input by picking the item of "Help" in the menu, which is being displayed in the upper area of the editing picture on the CRT display device 4, using the mouse 5. By the input of the help request code, the help control program 8 is activated (Step s 2), and the window control program 305 which is subsequently activated opens a window 902 for help on the CRT display device 4 (Step s 3), as shown in FIG. 10, so that the display is performed which is used for requiring to select one of the help items such as "1. Error Message Guide", "2. Explanation of Keys", "3. Explanation of Terminology", "4. Operating Procedure Guide", and the like as the help menu picture (Step s 4). At this time, the window control program 305 refers to a display area map of the graphic form editing window 901 to search for an empty area in which a rectangular window, which is more than or equal to a constant value $x_o$ in breadth and more than or equal to a constant value $Y_o$ in length, can be opened, and then opens a window 902 for help having the size of at least $x_o \times y_o$. Then, in the case where the empty area in which the rectangular window having the size of at least $x_o \times y_o$ can be opened is not found, the size of the graphic form editing window 901 is reduced or the graphic form editing window 901 is moved so as to be able to secure the empty area in which the window 902 for help having the size of at least $x_o \times y_o$ can be opened (refer to FIG. 11). As for the method for reducing the size of the window, a well known method such as the thinning out of picture elements is available. In addition, as for the movement of the window, the movement control by the instruction of the bit-Blt (bit-boundary Block transfer) operation may be utilized.

Figure 12:
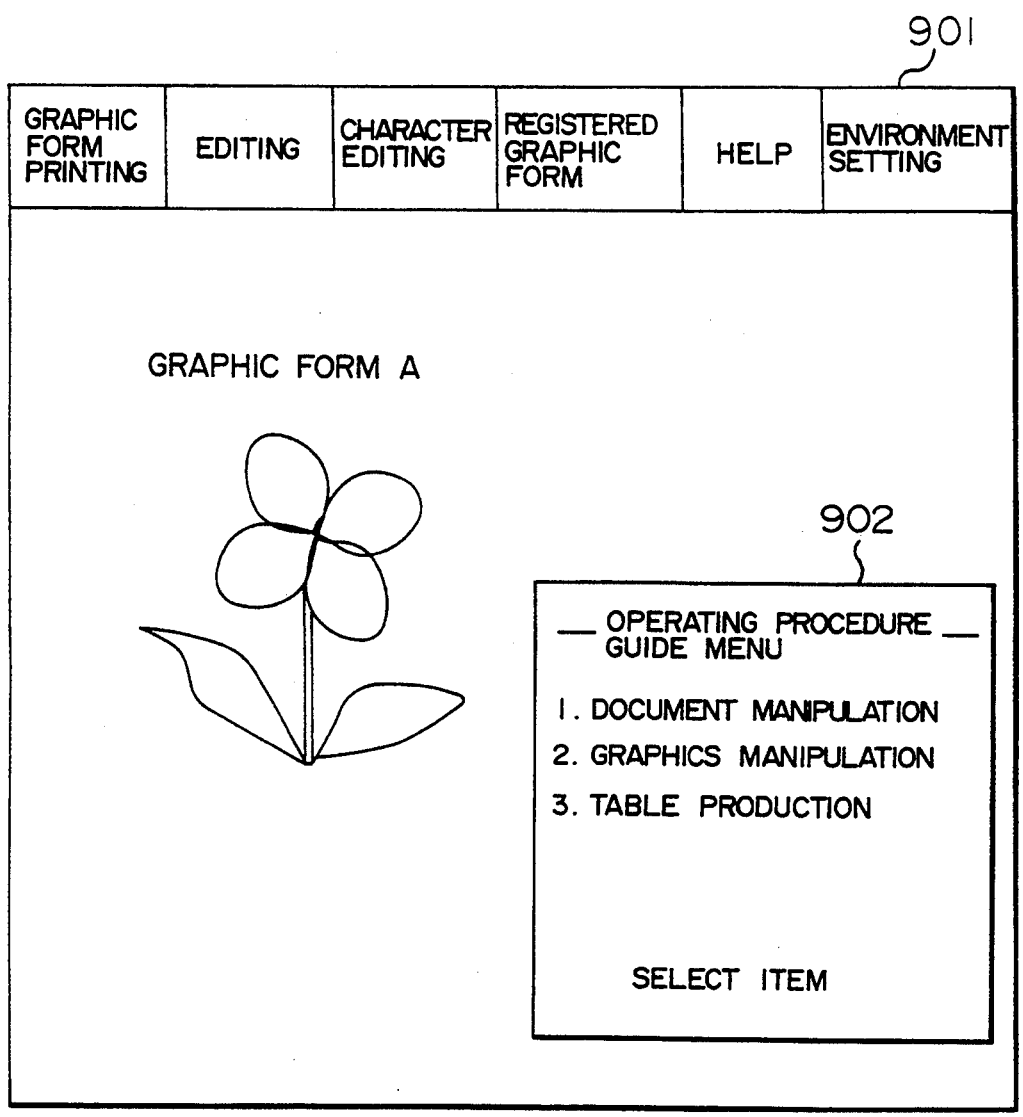
FIG. 12 is a diagram showing an example of an operating procedure guide menu.
Figure 13:
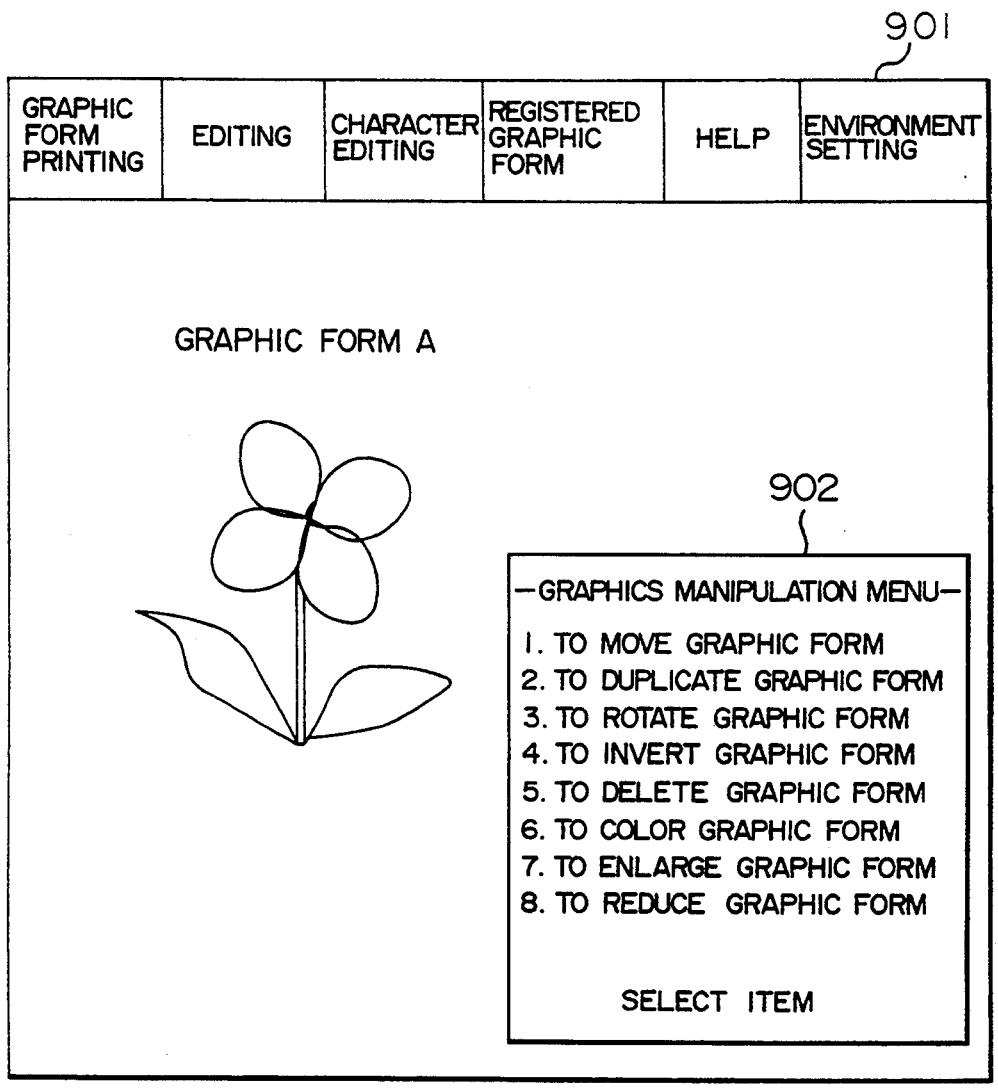
FIG. 13 is a diagram showing an example of a graphic form operating menu.

Moreover, an initial value "20" of the number of frames f which are displayed for one second is stored in a display speed storing area of the main memory unit 3 (Step s 4). Then, the user looks at the help menu picture on the window 902 for help and then inputs the item number "4" using the associated key on the keyboard 1 in order to select the item of "4. Operating Procedure Guide", for example, out of all of the items (Step s 5). In this case as well, it is to be understood that the input may be performed by picking the item of "4. Operating Procedure Guide" of the help menu picture on the window 902 for help using the mouse 5. By inputting that code, the operating procedure guide program 304 included in the help control program 8 is activated (Step s 6), and then the display for requiring to select one of the operating procedure items such as "1. Document Manipulation", "2. Graphics Manipulation", and "3. Table Production" shown as the operating menu picture in FIG. 12 is carried out (Step s 7). Then, the user looks at the picture of the operating procedure menu on the window 902 for help and then inputs the item number "2" using the associated key on the keyboard 1 in order to select the item of "2. Graphics Manipulation" (Step s 8). In this case as well, it is to be understood that the input may be performed by picking the item of "2. Graphics Manipulation" of the help menu picture using the mouse 5. By inputting the input information code, a graphics manipulation menu table 322 which is linked with a graphics manipulation procedure display program 312 is read out (Step s 9) and then the list of the operating menu items is displayed as shown in FIG. 13 (Step s 10). FIG. 14 shows a data structure of the graphics manipulation menu table 322. The item numbers and the menu items which are shown in FIG. 13 are displayed on the basis of a code of the code column 201 and the items of the column 202 of the manipulation menu item which are included in the data of FIG. 14. Since the user wants to duplicate the desired graphic form, the user inputs the code number "2", which corresponds to the item of "To Duplicate Graphic Form" in the items of the manipulation menu, by pressing down the associated key on the keyboard 1 (Step s 11). In this case as well, the input operation may be performed by picking the item of "2. To Duplicate Graphic Form" in the picture of the manipulation menu using the mouse 5. By inputting that code, the address "1002" is read out which is included in the item 203 of an image data address and corresponds to "2" in the column 201 of a code of the graphics manipulation menu table 322 (Step s 12).

The data structure of the animated picture help data 9 is as shown in FIG. 15. In the figure, a header 401 designates a data address ADRS, a header 401' designates a tag CT which represents the image coding system, a header 402 designates the transverse length X of the image of one frame, a header 403 designates the vertical length Y of the image of one frame, and a header 404 designates the number of frames N forming one scene of the animated picture. In addition, the data after a header 405 is image data which is represented by R, G and B. In the present embodiment, it is assumed that the image is not compressed, and the tag CT 401' representing the image coding system contains a code for representing non-compression. The data which corresponds to the image data address "1002" (refer to FIG. 14), which was read out, is detected out of the data address ADRS, and the data of R1, G1, B1, R2, G2, B2, . . . are read out in sequence with $X \times Y$ treated as the data for one frame, to thereby form N frames (Step s 13). The animated picture is constructed in such an order of FIG. 16A–FIG. 16B–FIG. 16C . . . FIG. 16Z. That is, the cursor is positioned to the top left position of the graphic form (refer to FIG. 16A) and then is moved to the bottom right of the graphic form so as to surround the graphic form (refer to FIG. 16C) while dragging the mouse (refer to FIG. 16B). Next, the cursor is moved to the item of "Graphic Form Editing" of the menu displayed in the upper area of the picture, the pull-down menu is drawn out by the clicking and the item of "Duplication" is selectively clicked in the menu (refer to FIG. 16D). Thereafter, the cursor is moved to the position where the duplication is to be performed, thereby to duplicate the desired graphic form (refer to FIG. 16Z). This situation is displayed in the form of animated picture.

Next, a counter variable i stored in the main memory unit 3 is reset to zero (Step s 21), and "20" is taken out which is the initial value of the number of frames f, which have been stored in the display speed storing area of the main memory unit 3 and are displayed for one second (Step s 22). In this connection, the counter variable i represents what number the frame being displayed is among the number of frames N forming a group of animated pictures. When the number of frames f is positive, i.e., in the case where the animated picture is displayed with the positive feed (Step s 23), if the relationship of i<N is established (Step s 24), the counter variable i is then incremented (Step s 25), and the image data of the i-th frame among the N frames is sent to the video RAM 19 at intervals of a fixed time (1/f sec) through the display controller 20 (Step s 26). By the above-mentioned operation, the image is displayed in the form of an animated image. Moreover, if the relationship of i≧N is established, the above-mentioned image data of the i-th frame is similarly sent to the video RAM 19 at intervals of a fixed time (1/f sec) through the display controller 20 without changing the counter variable i. On the other hand, when the number of frames f is negative, i.e., in the case where the animated picture is displayed with the backward playback, if i>N (Step s 28), the counter variable i is decremented (Step s 29), and the image data of the i-th frame among the above-mentioned N frames is sent to the video RAM 19 at intervals of a fixed time (1/abs(f) sec) through the display controller 20. In this connection, abs(f) is a function which represents the absolute value of f. Moreover, if i≦N, the above-mentioned image data of the i-th frame is similarly sent to the video RAM at intervals of a fixed time (1/abs(f) sec) through the display controller 20 without changing the counter controller i. In the case where the value of the number of frames f becomes "0", the image is displayed as the still image in the window 902 for help (Step s 30). As for the animated picture help data, in addition to the animated picture help data which is stored as the R, G and B data in the file, as shown in FIG. 1, the data of the animated picture which is recorded in VCR 12, LD 13, CD-ROM 14 and the like, may also be utilized. As for the method for utilizing the animated picture data by the external storage medium, for example, the embodiment which is described in an article "NIKKEI BYTE" (January 1991, pp. 204 to 243) is available.

When, during the display of the above-mentioned animated picture help message, the user inputs the code representing the end of the help by picking the "End" button in the upper portion of the display picture using the mouse 5 (Step s 31 and Step s 41), the window control program 305 closes the window 902 for help on the CRT display device 4 (Step s 40), and as a result, the help ends. Of course, the input of the code representing the end of the help is not limited to only the use of the mouse 5. That is, alternatively, such a step may be taken that the end key is provided on the keyboard 1 and the input is performed by pressing down that key. At this time, the window 902 for help is not closed, but the processing may be returned to the display of the picture of the graphics manipulation menu (refer to FIG. 13) (Step s 10), the display of the picture of the operating menu (refer to FIG. 12) (Step s 7), or the display of the picture of the help menu (refer to FIG. 10) (Step s 4).

Figure 17:
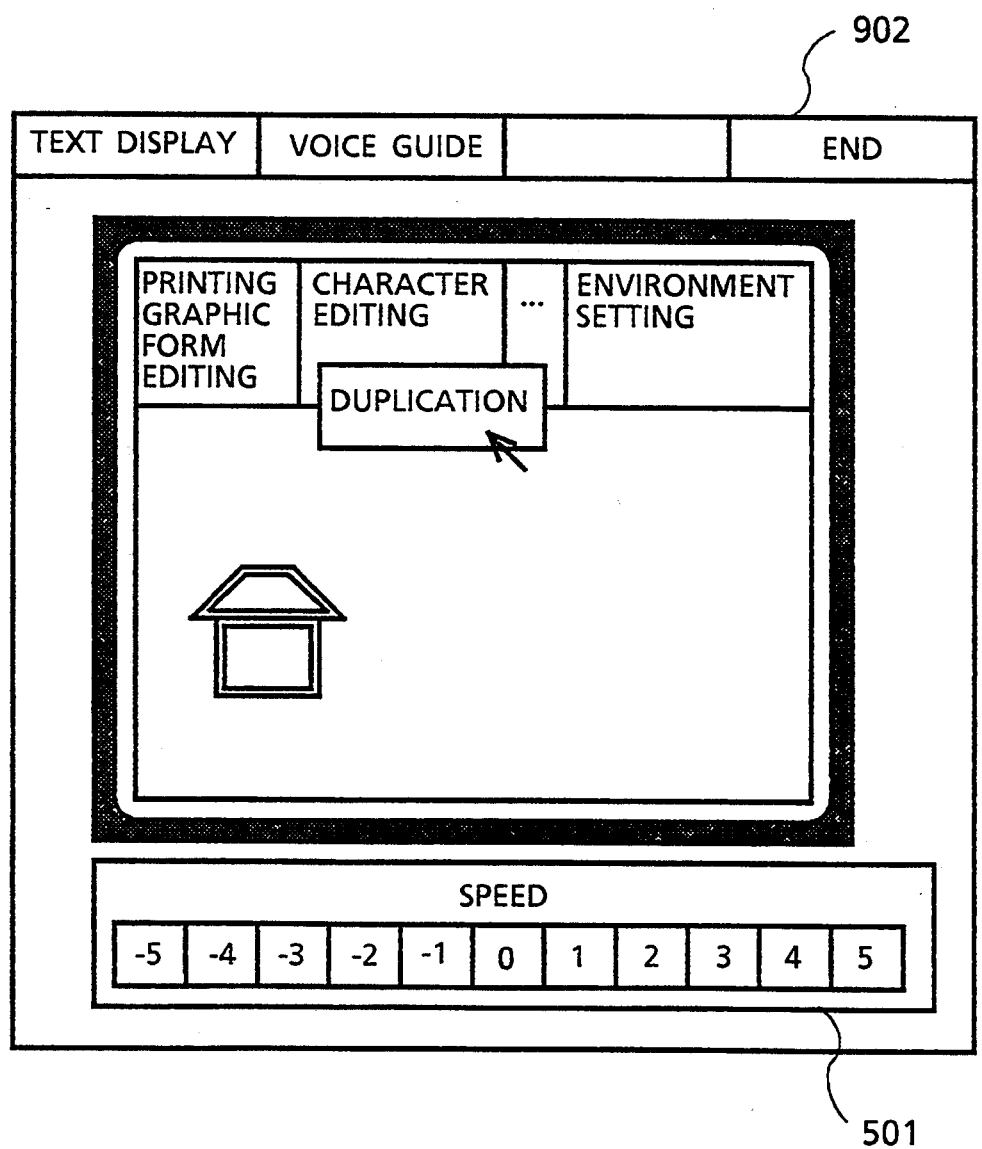
FIG. 17 is a diagram showing a display example of animated picture help guidance.

The display speed of the above-mentioned animated picture can be made variable. That is, as shown in FIG. 17, the help control program 305 serves to display a display speed control board 501 in the window 902 for help all the time. Then, when the user wants to change the display speed, the user specifies the desired display speed on the display speed control board 501 using either the mouse 5 or the keyboard 1. When the user specifies the desired display speed value on the display speed control board 501 using the mouse 5 to thereby input a display speed control code (Step s 32), a display speed control program 331 in the help control program 8 is activated (Step s 33). Then, the display speed control program 331 reads out the number of frames f, which are to be displayed for one second, by referring to a display speed table 332 (Step s 34), and stores the number of frames f thus read out in the display speed storing area of the main memory unit 3 (Step s 35). Thereafter, the processing is returned to Step s 21. The data structure of the display speed table 332 is shown in FIG. 18. For example, when the user specifies the display speed "4" on the display speed control board 501 using either the mouse 5 or the keyboard 1, "40" is read out which includes in the column 602, the number of frames f and corresponds to "4" in the column 601 of the display speed code, and then is stored in the display speed storing area of the main memory unit 3. As a result, the image pattern is displayed in the window 902 for help one frame by one frame at intervals of 40 seconds.

Figure 7:
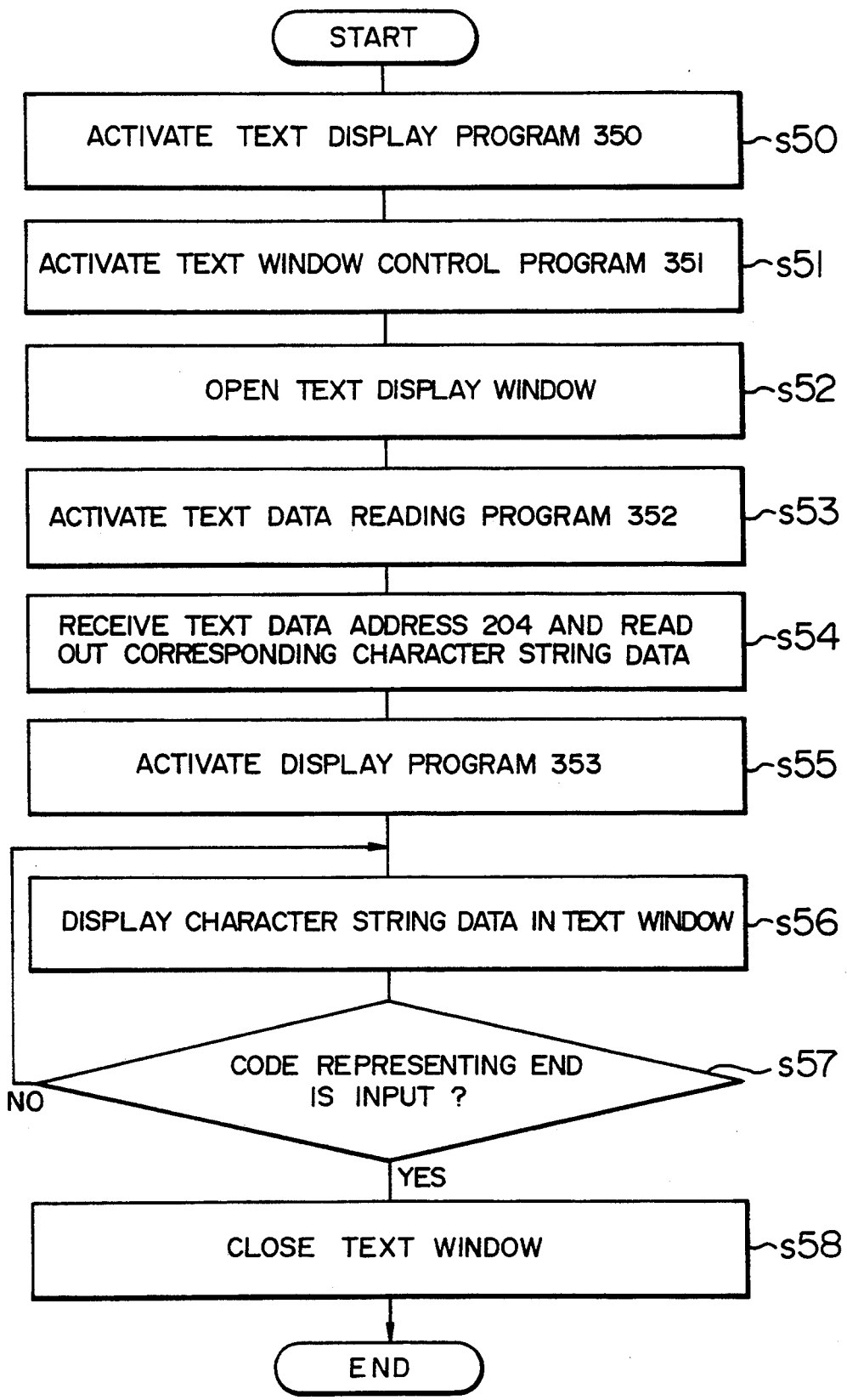
FIG. 7 is a flow chart showing the operation of an embodiment of a text display process.
Figure 8:
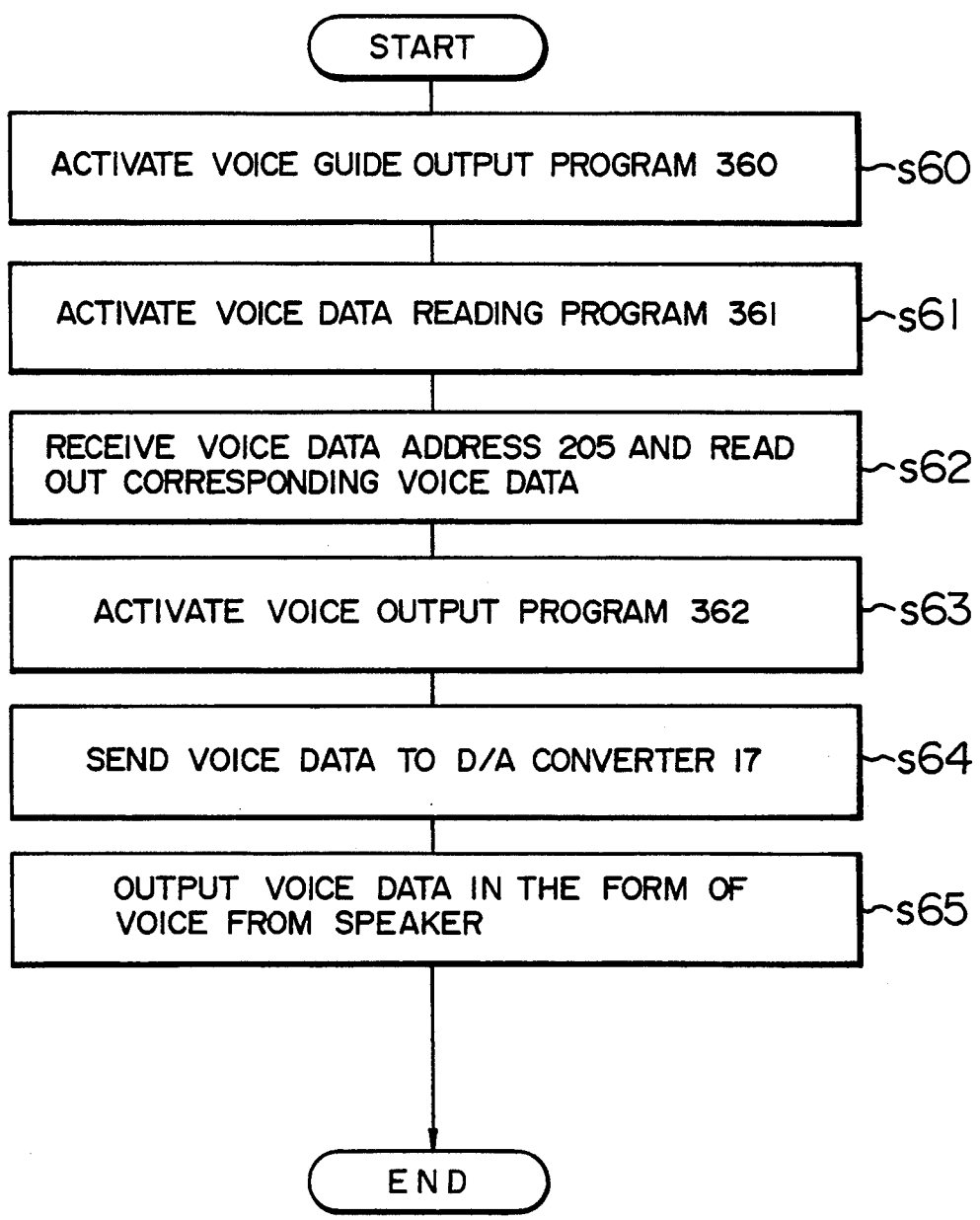
FIG. 8 is a flow chart showing the operation of an embodiment of a voice guide output process.

According to the present invention, the help guidance information can be presented in text form or by voice, as well as in the form of an animated picture. The method of presenting text help guidance information in the form or by voice will hereinbelow be described in detail with reference to the flow charts shown in a part of FIG. 6, FIG. 7 and FIG. 8.

Figure 11:
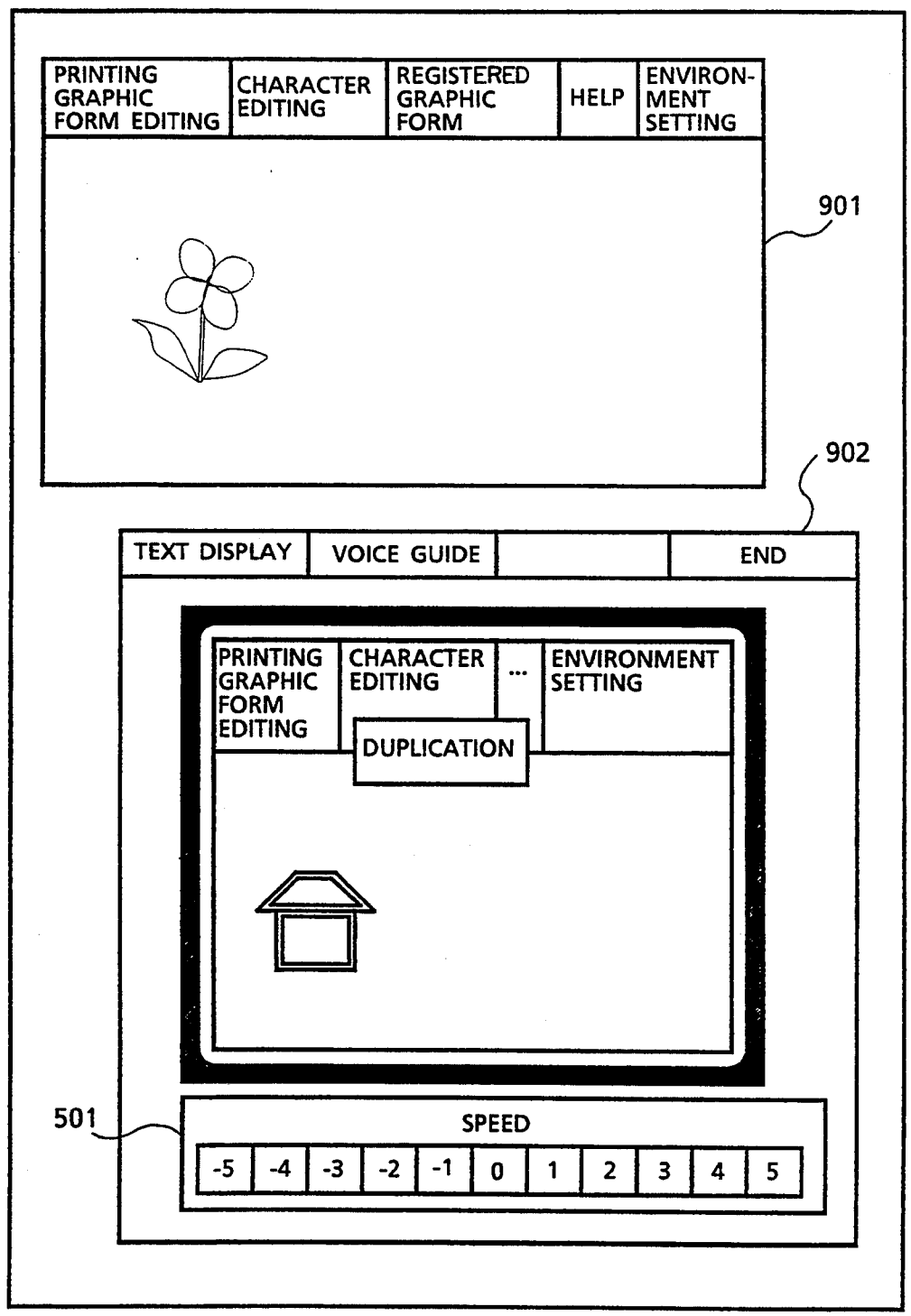
FIG. 11 is a diagram showing another example a help menu.
Figure 19:
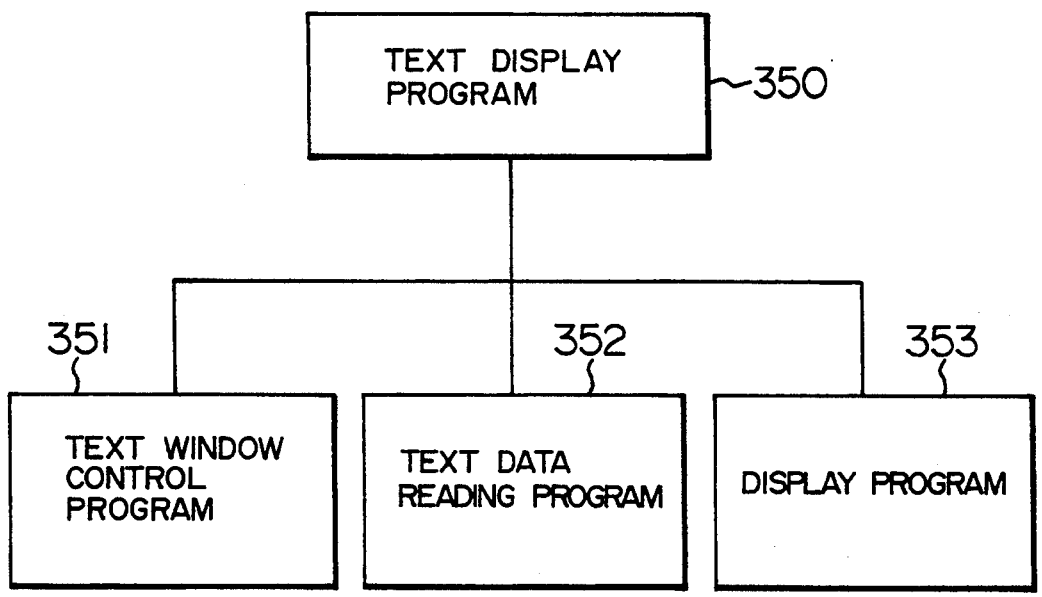
FIG. 19 is a diagram showing a module structure of an example of a text display program.
Figure 20:
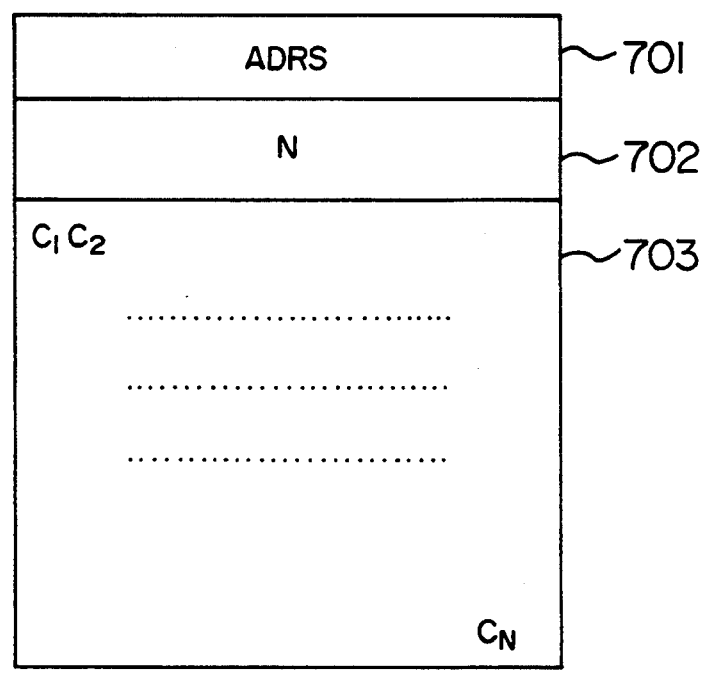
FIG. 20 is a diagram showing a data structure of text help message data.
Figure 21:
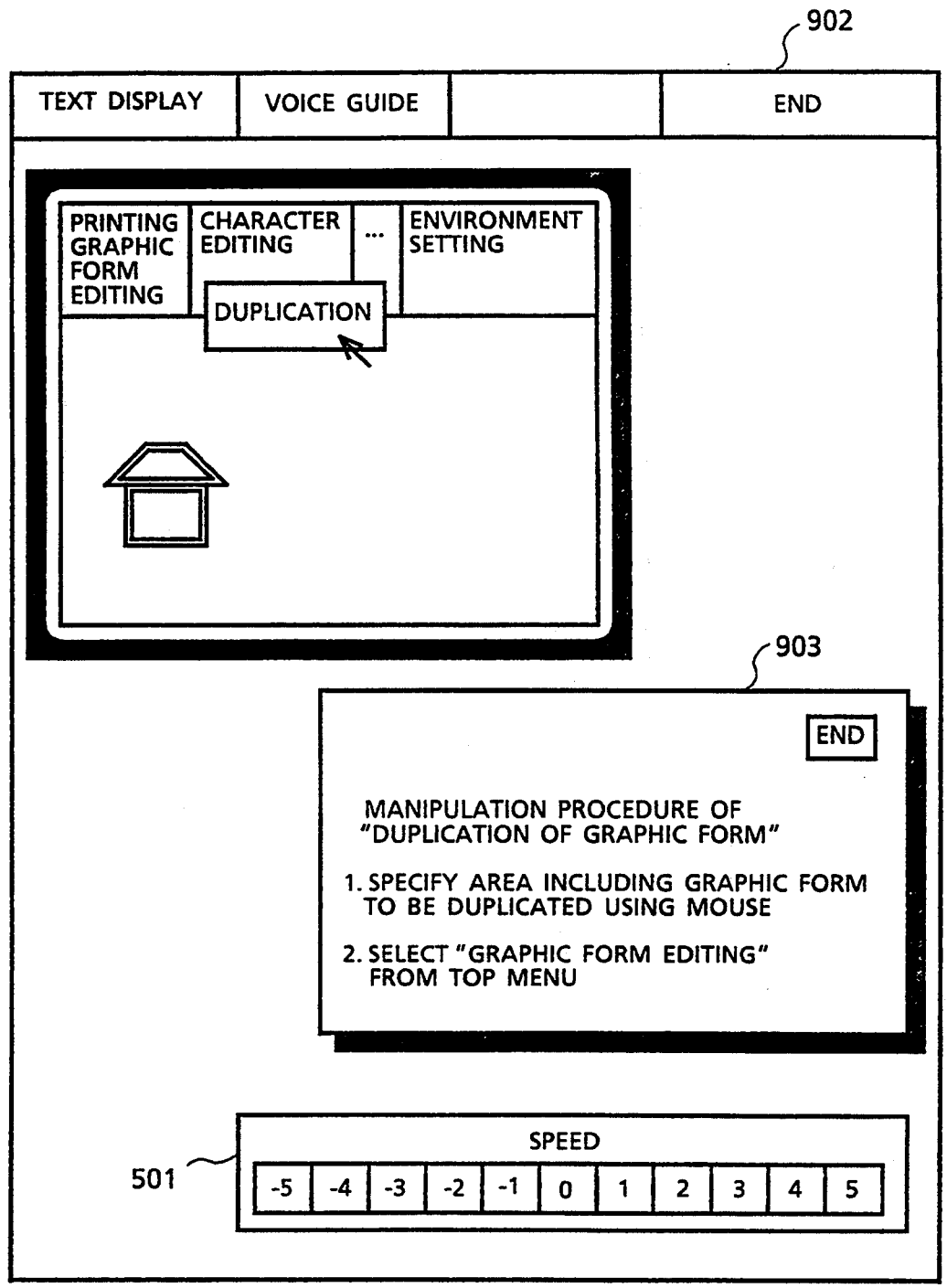
FIG. 21 is a diagram showing a display example of a text help message.
Figure 23:
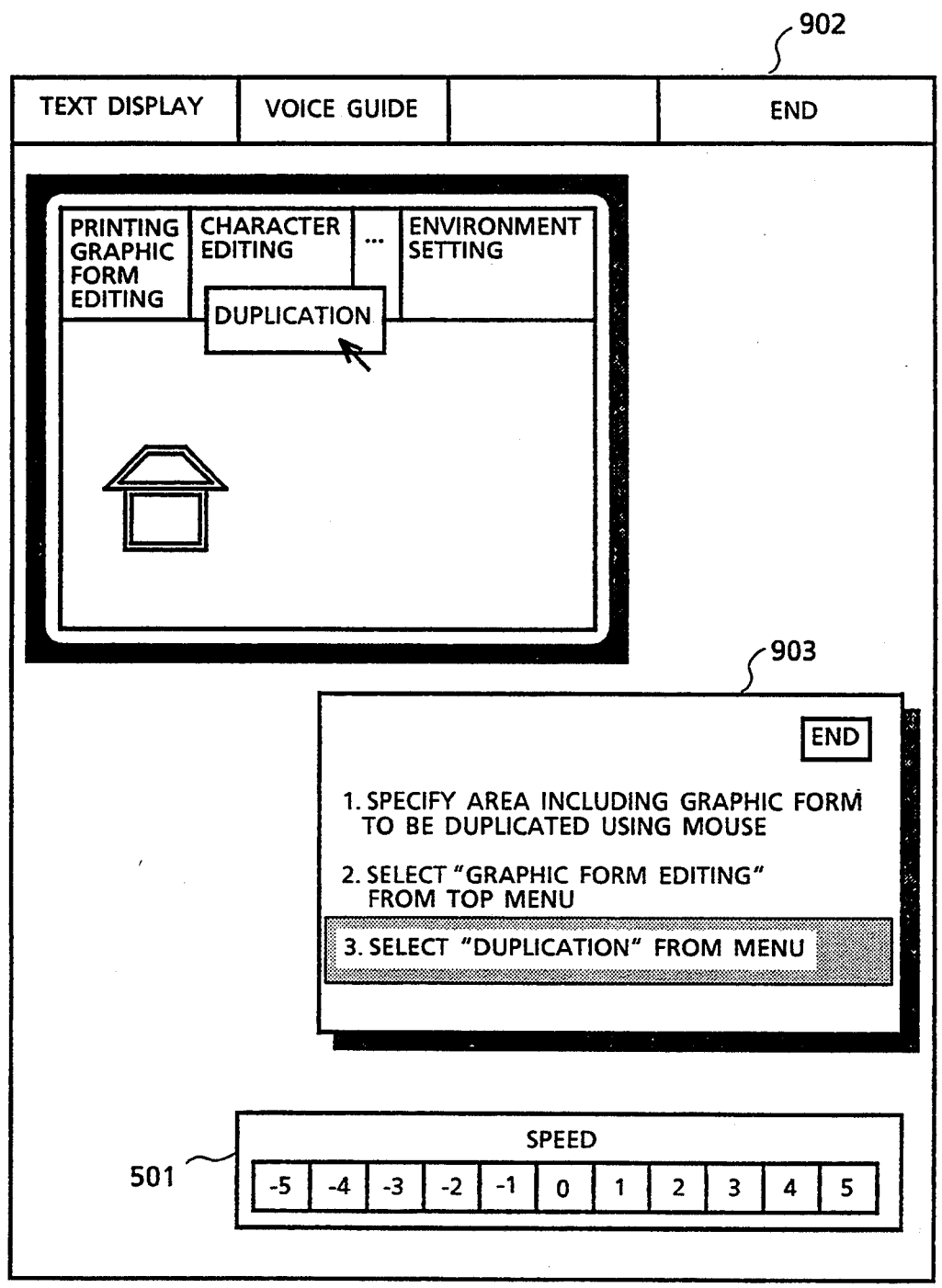
FIG. 23 is a diagram showing a display example of a text help message.

When, out of the menu items provided in the upper area of the window 902 for help of FIG. 17, the item of "Text Display" is selected using the mouse 5, a graphics manipulation procedure display program 312 (refer to FIG. 9) reads out the address "2002" which is included in the column 204 of the text data address and corresponds to the code "2" in the column 201 of the code (refer to FIG. 14) of the graphics manipulation menu table 322 which is linked with this program 312 (Step s 36). Subsequently, a text display process is carried out (Step s 37). This process is operated independently of that of the above-mentioned help control program, and consists of the module group which includes mainly a text display program shown in FIG. 19. First, the text display program 350 is activated (Step s 50), a text window control program 351 is then activated (Step s 51), and a window 903 for a text message (refer to FIG. 21) is opened (Step s 52). At this time, the window control program 351 searches for the empty area in which the rectangular window can be opened which is more than or equal to a fixed value $x_1$ in breadth, and is more than or equal to a fixed value $y_1$ in length by referring to the display area map of the window 902 for help, and then opens a window 903 for a text message having the size of at least $x_1 \times y_1$. Then, in the case where the empty area in which the rectangular window having the size of at least $x_1 \times y_1$ can be opened is not found, as shown in FIG. 21, the size of the animated picture display window of the window 902 for help is reduced or the animated picture display window is moved to be able to secure the empty area in which the window 903 for a text message having the size of at least $x_1 \times y_1$ can be opened. As for the method of reducing the size of the above-mentioned window, the well known method for the thinning out of the picture elements can be utilized. In addition, for the movement of the above-mentioned window, the movement control by the bit-Blt operation instruction can be utilized. In this case, as shown in FIG. 11, such a method may also be taken that the size of the graphic farm editing window 901 is reduced or the graphic form editing window 901 is moved to secure the empty area, and the window 903 for a text message is opened in that empty area separately from the animated picture display window 902. Next, a text data reading program 352 (refer to FIG. 19) is activated (Step s 53), the text data address "2002" (refer to FIG. 14) is received on the basis of the process of the above-mentioned help control program, and the corresponding text help message data 10 is read out (Step s 54). The data structure of the text help message data 10 is as shown in FIG. 20. In the figure, a header 701 designates data addresses ADRS, a header 702 designates a length N of a character string, and a header 703 designates text data of the help message. Then, the data which corresponds to the above-mentioned text data address "2002" received is detected from the data addresses ADRS, and the data of the character string $c_1, c_2, \ldots, c_N$ is read out. Subsequently, a display program 353 (refer to FIG. 19) is activated (Step s 55), and the data of the character string $c_1, c_2, \ldots, c_N$ is displayed in the above-mentioned text message window 903 through the display controller 20 and the video RAM 19, in the manner as shown in FIG. 21 for example (Step s 56). At this time, the display may also be performed in such a way that the animated image corresponds to the text message. That is, such a procedure may be taken that the text which is made to correspond to the frame of the animated picture is previously included in the text help message data 10, and the frame number of the animated picture and the character position of the text are stored in the message correspondence table 21 (refer to FIG. 1) in such a way as to correspond to each other. FIG. 22 shows the data structure of the message correspondence table 21. With respect to the items corresponding to the text data address "1002" in an address column 611 of the message correspondence table 21, $p_{1002i}$ and $p_{1002i+1}$ in the data of the column 613 of the text help message position are read out which correspond to the frame number i of the animated picture being displayed at present and the frame number (i+1) of the animated picture to be displayed at the next time, respectively, and only the data of the character string from $c_{P1002i}$ to $c_{P1002i+1}-1$ which corresponds to those text message positions is displayed as the text message. Alternatively, as shown in FIG. 23, the marking display may be performed in such a way that the user can readily understand the contents of the display. For this purpose, a display part corresponding to the character string data from $c_{P1002i}$ to $c_{P1002i+1}-1$ may be, for example, inverted with the display colors of black and white. Moreover, such an alternative method may be taken that the user specifies a part $c_j$ of the character string being displayed, the animated picture frame number corresponding to the specified position $c_j$ of the character string is read out from the column 612 of the animated picture frame number in the message correspondence table 21, and the animated picture of that frame number is displayed.

When the user picks the "End" button, which is displayed in the upper area of the window 903 for the text help message (refer to FIG. 21), using the mouse 5 (Step s 57), the text window control program 351 closes the window 903 for the text help message, and then the picture of the display is returned to the former animated picture help picture (Step s 58). At the same time, the text display process ends.

The display of the text message as described hereinabove is effective if automatically performed when it is difficult for the user to grasp the contents of the manipulation procedure with the assistance of only the animated picture help information, as well as in the case where the item of "Text Display" is picked to be selected using the mouse 5. That is, in the case where the user repeatedly reproduces the animated picture help information by a number of times more than or equal to the predetermined number of times, or, in the case where the period of time from the time when the playback of the animated picture help information ends until the time when the user carries out the actual work exceeds a predetermined constant value, the user cannot sufficiently grasp the contents of the manipulation procedure with the assistance of only the animated picture help information. Therefore, the display of the text help message is then performed. For this purpose, a playback number counting area for counting the playback number of times is provided in the main memory unit 3. Then, immediately after starting the work, that playback number counting area is reset to zero. If in Step s 12, the image data address ADRS which is the same as in the last time is read out, the playback number counting area is incremented. In addition, right after Step s 21, the count value of the playback number counting area is compared with a predetermined constant value $\alpha$. Then, if (the count value of the playback number counting area) $> \alpha$, the step s 50 and the steps after Step s 50 will be carried out. Alternatively, a still image display time measuring area for storing the display time of the still image is provided in the main memory unit 3. Then, just after the image display is performed (just after Step s 21), the present time is stored in the still image display time measuring area by utilizing a clock on the work station. Then, just after Step s 31, similarly, the present time is read by utilizing the clock on the work station, and the difference T1 between the present time, and the last time, i.e., the value in the still image display time measuring area is calculated. If the relationship of T1 > (a predetermined constant value $\beta$) is established, the text display program is executed.

Figure 24:
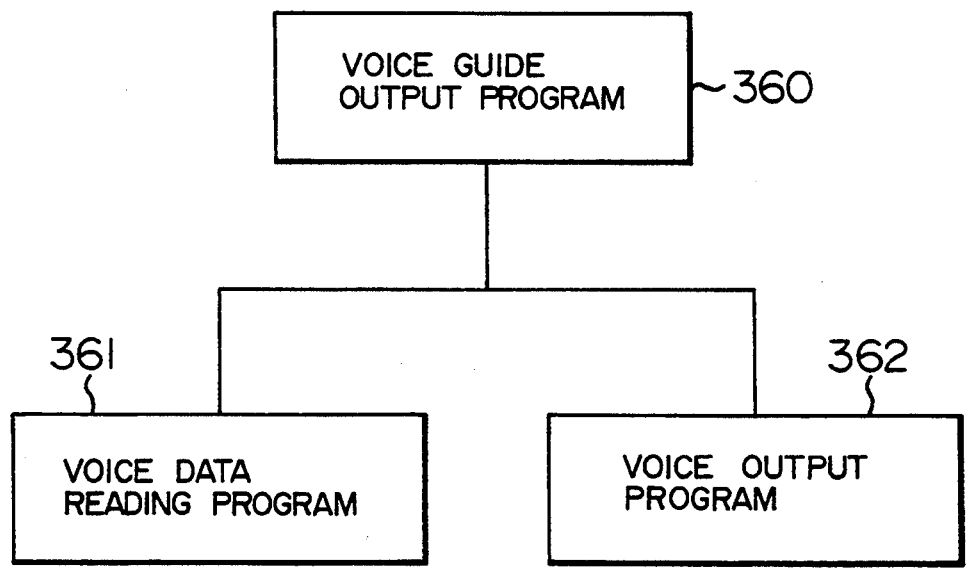
FIG. 24 is a diagram showing a module structure of an example of a voice guide output program.
Figure 25:
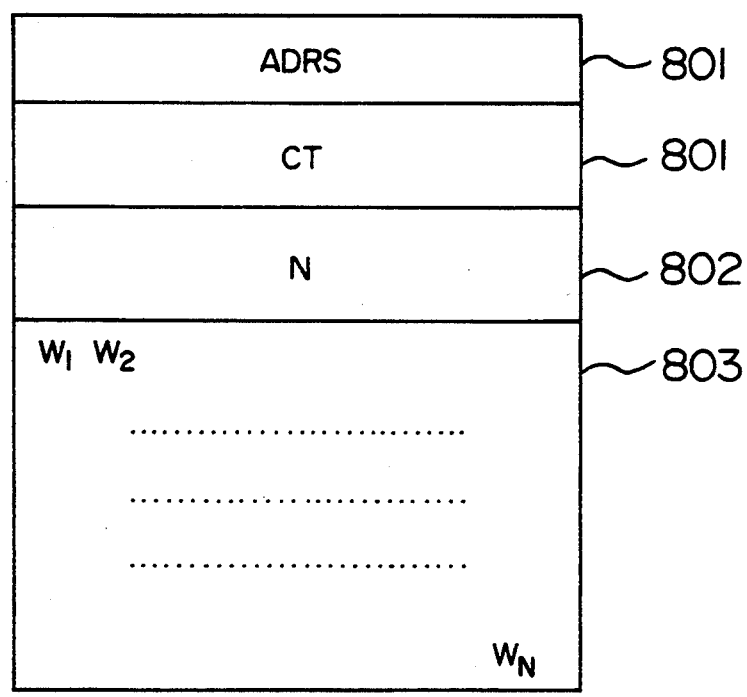
FIG. 25 is a diagram showing a data structure of voice help message data.

On the other hand, when the item "Voice" is selected from the menu items in the upper area of the window 902 for help shown in FIG. 17 using the mouse 5, the graphics manipulation procedure display program 312 (refer to FIG. 9) reads out an address "3002" which is included in the column 205 of the voice data address and corresponds to "2" in the code 201 (refer to FIG. 14) of the graphics manipulation menu table 322 linked with that program 312 (Step s 38). Subsequently, a voice guide output process is carried out (Step s 39). This process is operated independently of the process of the above-mentioned help control program, and consists of the module group which includes mainly a voice guide output program shown in FIG. 24. First, the voice guide output program 360 is activated (Step s 60). Subsequently, a voice data reading program 361 is activated (Step s 61). Then, the voice data address "3002" (refer to FIG. 14) is received on the basis of the process of the above-mentioned help control program, and the corresponding voice help message data 11 (refer to FIG. 1) is read out (Step s 62). The data structure of the voice help message data 11 is as shown in FIG. 25. In the figure, a header 801 designates data addresses ADRS, a header 801' designates a tag CT for representing the voice coding system, a header 802 designates a voice data length N, and a header 803 designates voice waveform data of the help message. In the present embodiment, it is assumed that the voice is not compressed, and the code for representing the non-compression is included in the tag CT 801' for representing the voice coding system. The data address which corresponds to the voice data address "3002", which was already read out, is detected from the above-mentioned data addresses ADRS, and voice data $w_1, w_2, \ldots, w_N$ is read out. Subsequently, a voice output program 362 (refer to FIG. 24) is activated (Step s 63), and the voice data is output as the voice guidance from the speaker 18 (Step s 65) through the D/A converter 17 (Step s 64). At this time, the voice data may also be output in such a way that the animated image and the voice guidance are made to correspond to each other. That is, such a method may be taken that the voice data, which is made to correspond to the animated picture frame, is previously included in the voice help message data 10, and the frame number of the animated picture and the position on the time axis of the voice waveform are stored in the above-mentioned message correspondence table 21 so as to correspond to each other. With respect to the items corresponding to "1002" of the text data address 204 in the address column 611 (refer to FIG. 22) of the table 21, $q_{1002i}$ and $q_{1002i+1}$ in the data of the column 614 of the voice help message position are read out which correspond to the frame number i of the animated picture being displayed at present and the frame number (i+1) of the animated picture to be displayed at the next time, respectively, so that the voice data from $w_{q1002i}$ to $w_{q1002i+1}-1$ corresponding to those voice help message positions may be output as the voice guidance. In addition, alternatively, another method may be taken such that $p_{1002i}$ and $p_{1002i+1}$ in the data of the column 613 of the text help message position are read out which correspond to the frame number i of the animated picture being displayed at present and the frame number (i+1) of the animated picture to be displayed at the next time, respectively, and then the character string data from $c_{p1002i}$ to $c_{p1002i+1}-1$ corresponding to those text help message positions are displayed as the text message simultaneously. Moreover, such an alternative method may also be taken that the user specifies a part $c_j$ of the character string being displayed using the mouse 5 or the like, the data position of the voice waveform corresponding to the specified position $c_j$ of the character string is read out from the column 614 of the voice help message position in the above-mentioned message correspondence table 21, and the voice guidance starting from that position is output. The voice output is completed, and at the same time, the voice guide output process ends.

As described earlier, in the case where the user repeatedly reproduces the animated picture help information by the number of times more than or equal to the predetermined number of times, or, in the case where the period of time T2 from the time when the playback of the animated picture help information ends until the time when the user performs the actual work is measured by utilizing the clock on the work station and T2 exceeds a predetermined constant value $\gamma$, since it is guessed that the user can not grasp the contents of the procedure with the assistance of only the animated picture help information, the display of the text help message is performed. At this time, however, instead of the display of the text help message, on the basis of the method formed by the steps from Step s 60 to Step s 65, the presentation of the voice help message may be performed.

Further, in the case where the user performs the still playback of the animated picture help information for a time more than or equal to a predetermined time, the voice help message cannot be presented continuously. Therefore, in the same manner as in the above case, the display of the text help message is performed using the above-mentioned method (formed by the steps from Step s 50 to Step s 56), thereby to promote better understanding by the user.

Although the present invention has been described by taking "Duplication" as the working example by way of example, it is to be understood that the present invention is not limited to only the item of "Duplication". That is, in FIG. 13, even in the case where any work such as "Movement", or "Rotation" other than "Duplication" is selected out of the menu displayed in the window 902 for help, the help guide may be performed by following the same necessary procedure as in the above-mentioned method. In addition, out of the help functions, the actual help guide is not limited to only "Operating Procedure Guide". That is, in the case where "Error Message Guide" is selected in the help menu displayed in the window 902 for help of FIG. 10, by following the same necessary procedure as that of the above-mentioned method, the detailed explanation of the error can be guided using the text, and the measures or recovery of the error can be guided using the animated picture. Moreover, in the case where "Explanation of Keys" is selected in the help menu displayed in the window 902 for help of FIG. 10, by following the same necessary procedure as that of the above-mentioned method, the explanation of the keys can be guided using the text, and the supplementary explanation with respect to the situation when the individual keys are actually pressed down can be guided using the animated picture. Further, in the case where "Explanation of terminology" is selected in the help menu displayed in the window 902 for help, by following the same necessary procedure as that of the above-mentioned method, the explanation of the terminology can be guided using the text, and the supplementary explanation can be guided using the animated picture. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A help guidance method utilizing an animated picture, used for an information processor including memory means for storing a help control program for controlling help guidance, animated picture help data, text help data and voice help data used for carrying out said help guidance, and a table for showing the correspondence relationship among said animated picture help data, said text help data and said voice help data, information input means, and display means for representing information stored in said memory means in a form of image and/or voice, said method comprising the steps of:

activating, when a user inputs a help command for requiring the help guidance using said information input means, said help control program to display fields, in which said help guidance is to be carried out, in a form of a help menu;

reading out, when the user selects the field requiring said help guidance from said help menu, the animated picture help data corresponding to selected contents, and at least one of said text help data and said voice help data, which correspond to said animated picture help data corresponding to selected contents, from said memory means by referring to said table; and outputting said data read out to said display means, wherein said output step includes the steps of:

checking whether or not a window in which guidance information is to be displayed can be displayed in a position of a work picture without overlapping with a displayed object of said work picture, and displaying, if said window can be displayed, said window in an area in which said displayed object of said work picture is absent.

2. A method according to claim 1, wherein said output step includes the steps of:

checking, when said guidance information contains plural different kinds of help data, whether or not said help data can be displayed in individual positions where said help does not overlap with one another; and displaying, if said display cannot be performed, at least one display area of said help data in a reduction manner.

3. A method according to claim 2, wherein said output step includes a step of displaying at least one of said help data on said work picture.

4. A method according to claim 1, wherein said output step includes the steps of:

checking, when said guidance information contains said animated picture help data and said text help data, whether or not said help data can be displayed in individual positions where said help data does not overlap with one another; and displaying, if said display cannot be performed, at least one display of said help data in a reduction manner.

5. A method according to claim 1, wherein said output step includes a step of displaying, when said guidance information contains said animated picture help data and said text help data, one of said help data on said work picture.

6. A help guidance method utilizing an animated picture, used for an information processor including memory means for storing a help control program for controlling help guidance, animated picture help data, text help data and voice help data used for carrying out said help guidance, and a table for showing the correspondence relationship among said animated picture help data, said text help data and said voice help data, information input means, and display means for representing information stored in said memory means in a form of image and/or voice, said method comprising the steps of:

activating, when a user inputs a help command for requiring the help guidance using said information input means, said help control program to display fields, in which said help guidance is to be carried out, in a form of a help menu;

reading out, when the user selects the field requiring said help guidance from said help menu, the animated picture help data corresponding to selected contents, and at least one of said text help data and said voice help data, which correspond to said animated picture help data corresponding to selected contents, from said memory means by referring to said table; and outputting said data read out to said display means, wherein said output step includes the steps of:

checking whether or not a window in which guidance information is to be displayed can be displayed in a position of a work picture without overlapping with a displayed object of said work picture; and displaying, if said window cannot be displayed, said work picture in a reduced manner and displaying said window in a display area other than said reduced work picture.

7. A method according to claim 6, wherein said output step includes the steps of:

checking, when said guidance information contains plural different kinds of help data, whether of not said help data can be displayed in individual positions where said help data does not overlap with one another; and displaying, if said display cannot be performed, at least one display area of said help data in a reduction manner.

8. A method according to claim 2, wherein said output step includes a step of displaying at least one of said help data on said work picture.

9. A method according to claim 6, wherein said output step includes the steps of:

checking, when said guidance information contains said animated picture help data and said text help data, whether or not said help data can be displayed in individual positions where said help data does not overlap with one another; and displaying, if said display cannot be performed, at least one display area of said help data in a reduction manner.

10. A method according to claim 6, wherein said output step includes a step of displaying, when said guidance information contains said animated picture help data and said text help data, one of said help data on said work picture.

11. A help guidance method utilizing an animated picture, used for an information processor including memory means for storing a help control program for controlling help guidance, animated picture help data, text help data and voice help data used for carrying out said help guidance, and a table for showing the correspondence relationship among said animated picture help data, said text help data and said voice help data, information input means, and display means for representing information stored in said memory means in a form of image and/or voice, said method comprising the steps of:

activating, when a user inputs a help command for requiring said help guidance using said information input means, said help control program to display fields, in which said help guidance is to be carried out, in a form of a help menu;

reading out, when the user selects the field requiring said help guidance from said help menu, the animated picture help data corresponding to the selected contents, and at least one of said text help data and said voice help data, which correspond to said animated picture help data corresponding to selected contents, from said memory means by referring to said table; and outputting said data read out to said display means, wherein said output step includes the steps of:

displaying a window to display at least said animated help data in a work picture so as not to overlap an object that is currently displayed in said work picture;

reducing repeatedly said animated picture help data to display said animated picture help data, and outputting, when a number of playback repetitions of said animated picture help data exceeds a predetermined number of times, at least one of said text help data and said voice help data, which correspond to said animated picture help data, together with said animated picture help data.

12. A help guidance method utilizing an animated picture, used for an information processor including memory means for storing a help control program for controlling help guidance, animated picture help data, text help data and voice help data used for carrying out said help guidance, and a table for showing the correspondence relationship among said picture help data, said text help data and said voice help data, information input means and display means for representing information stored in said memory means in a form of image and/or voice, said method comprising the steps of:

activating, when a user inputs a help command for requiring the help guidance using said information input means, said help control program to display fields, in which said help guidance is to be carried out, in a form of a help menu;

reading out, when the user selects the field requiring said help guidance from said help menu, the animated picture help data corresponding to selected contents, and at least one of said text help data and said voice help data, which correspond to said animated picture help data corresponding to selected contents, from said memory means by referring to said table; and outputting said data read out to said display means, wherein said output step includes the steps of:

displaying a window to display at least said animated help data in a work picture so as not to overlap an object that is currently displayed in said work picture;

displaying a picture of said animated help data of time series in a forward or reverse direction at an arbitrary speed, wherein said step of displaying said animated picture help data at an arbitrary speed includes a step of displaying a still image and reading out, when said still image is displayed over a predetermined period of time, the text help data corresponding to said still picture from said memory means by referring to said table to display said text help data corresponding thereto.

13. A help guidance display device comprising:

information input means;

memory means for storing a help control program for controlling help guidance, animated picture help data, text help data and voice help data used for carrying out said help guidance, and a table for showing for the correspondence relationship among said animated picture help data, said text help data and said voice help data;

display means for representing information stored in said memory means in a form of image and/or voice;

means for activating said help control program when a help command for requiring said help guidance is input from said information input means, to display fields in which said help guidance is to be carried out in a form of help menu; and means for reading out, when a user selects the field for requiring said help guidance from said help menu using said information input means, the animated picture help data corresponding to the contents selected in response to a selection signal, and at least one of said help data and said voice help data corresponding to said animated picture help data which corresponds to the selected contents, from said memory means by referring to said table to output to said display means;

means for checking whether or not a window in which guidance information is to be displayed can be displayed in a position without overlapping with a displayed object in a work picture; and means for displaying, if said display cannot be performed, said work picture in a reduction manner.

14. A help guidance display device comprising:

information input means;

memory means for storing a help control program for controlling help guidance, animated picture help data, text help data and voice help data used for carrying out said help guidance, and a table for showing for the correspondence relationship among said animated picture help data, said text help data and said voice help data;

display means for representing information stored in said memory means in a form of image and/or voice;

means for activating said help control program when a help command for requiring said help guidance is input from said information input means, to display fields in which said help guidance is to be carried out in a form of help menu; and means for reading out, when a user selects the field for requiring said help guidance from said help menu using said information input means, the animated picture help data corresponding to the contents selected in response to a selection signal, and at least one of said help data and said voice help data corresponding to said animated picture help data which corresponds to the selected contents, from said memory means by referring to said table to output to said display means;

means for displaying a window to display at least said animated help data in a work picture so as not to overlap an object that is currently displayed in said work picture;

means for displaying, when a window in which said text help data is to be displayed overlap with a displayed object in a window in which said animated picture help data is to be displayed, at least one of said window in which said animated picture help data is to be displayed and said work picture window in a reduced manner; and means for displaying said text help data in an empty area provided by the reduced display of at least one of said windows in which said animated picture help data is to be displayed and said work picture window.

15. A help guidance display device comprising:

information input means;

memory means for storing a help control program for controlling help guidance, animated picture help data, text help data and voice help data used for carrying out said help guidance, and a table for showing for the correspondence relationship among said animated picture help data, said text help data and said voice help data;

display means for representing information stored in said memory means in a form of image and/or voice;

means for activating said help control program when a help command for requiring said help guidance is input from said information input means, to display fields in which said help guidance is to be carried out in a form of help menu; and means for reading out, when a user selects the field for requiring said help guidance from said help menu using said information input means, the animated picture help data corresponding to the contents selected in response to a selection signal, and at least one of said help data and said voice help data corresponding to said animated picture help data which corresponds to the selected contents, from said memory means by referring to said table to output to said display means;

means for displaying a window to display at least said animated help data in a work picture so as not to overlap an object that is currently displayed in said work picture;

means for counting a number of playback repetitions of said animated picture help data; and means for outputting, when the number of playback repetitions of said animate picture help data counted by said counting means exceeds a predetermined value, at least one of said text help data and said voice help data corresponding to said animated picture help data together with said animated picture help data.

16. A help guidance display device comprising:

information input means;

memory means for storing a help control program for controlling help guidance, animated picture help data, text help data and voice help data used for carrying out said help guidance, and a table for showing for the correspondence relationship among said animated picture help data, said text help data and said voice help data;

display means for representing information stored in said memory means in a form of image and/or voice;

means for activating said help control program when a help command for requiring said help guidance is input from said information input means, to display fields in which said help guidance is to be carried out in a form of help menu; and means for reading out, when a user selects the field for requiring said help guidance from said help menu using said information input means, the animated picture help data corresponding to the contents selected in response to a selection signal, and at least one of said help data and said voice help data corresponding to said animated picture help data which corresponds to the selected contents, from said memory means by referring to said table to output to said display means;

means for displaying a window to display at least said animated help data in a work picture so as not to overlap an object that is currently displayed in said work picture;

means for measuring a display time of a still picture of said animated picture help data; and means for reading out, when a value of said display time measuring means exceeds a predetermined value, the text help data corresponding to said still picture from said memory means by referring to said table to display said text help data.

* * * * *